(12) United States Patent
Yasui et al.

(10) Patent No.: US 12,703,380 B2
(45) Date of Patent: Aug. 11, 2026

(54) VEHICLE, CONTROL DEVICE AND CONTROL METHOD THEREFOR

(71) Applicant: HONDA MOTOR CO., LTD., Tokyo (JP)

(72) Inventors: Yuji Yasui, Wako (JP); Gakuyo Fujimoto, Wako (JP); Misako Yoshimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 32 days.

(21) Appl. No.: 18/674,201

(22) Filed: May 24, 2024

(65) Prior Publication Data

US 2024/0308539 A1 Sep. 19, 2024

Related U.S. Application Data

(63) Continuation of application No. PCT/JP2022/043369, filed on Nov. 24, 2022.

(30) Foreign Application Priority Data

Dec. 1, 2021 (JP) ................................ 2021-195610
Dec. 1, 2021 (JP) ................................ 2021-195618

(51) Int. Cl.
*B60W 50/16* (2020.01)
*B60K 35/28* (2024.01)
(Continued)

(52) U.S. Cl.
CPC ............. *B60W 50/16* (2013.01); *B60K 35/28* (2024.01); *B60W 10/20* (2013.01); *B60W 30/09* (2013.01);
(Continued)

(58) Field of Classification Search
CPC ...... B60W 50/16; B60W 10/20; B60W 30/09; B60W 30/0956; B60W 2050/143;
(Continued)

(56) References Cited

U.S. PATENT DOCUMENTS 9,783,055 B2 * 10/2017 Schmidt ................. B60K 35/81
9,884,585 B1 * 2/2018 Lubbers ............. B60W 30/095
(Continued)

FOREIGN PATENT DOCUMENTS

JP H07-167668 A 7/1995
JP 2007-034684 A 2/2007
(Continued)

OTHER PUBLICATIONS

International Search Report for PCT/JP2022/043369 mailed Feb. 7, 2023 with partial English Translation.

*Primary Examiner* — Mohamed Barakat
(74) *Attorney, Agent, or Firm* — THOMAS | HORSTEMEYER, LLP

(57) ABSTRACT

A control device for controlling a vehicle is configured to identify a risk factor present in surroundings of the vehicle and a direction of the risk factor with respect to the vehicle, display, on the display device, risk information indicating the direction of the risk factor with a first emphasis degree, and take a guidance action using the steering operation element. The guidance action guides a driver of the vehicle to operate the steering operation element to avoid the risk factor. When the guidance action using the steering operation element is taken, avoidance information indicating an advancing direction of the vehicle to avoid the risk factor is displayed on the display device, and the risk information is displayed with a second emphasis degree lower than the first emphasis degree, or the risk information is not displayed.

12 Claims, 16 Drawing Sheets

(51) Int. Cl.

| | |
|---|---|
| ***B60W 10/20*** | (2006.01) |
| ***B60W 30/09*** | (2012.01) |
| ***B60W 30/095*** | (2012.01) |
| ***G06V 20/59*** | (2022.01) |
| *B60W 50/14* | (2020.01) |

(52) U.S. Cl.

CPC ....... *B60W 30/0956* (2013.01); *G06V 20/597* (2022.01); *B60K 2360/178* (2024.01); *B60K 2360/1868* (2024.01); *B60K 2360/188* (2024.01); *B60W 2050/143* (2013.01); *B60W 2050/146* (2013.01); *B60W 2420/403* (2013.01); *B60W 2540/225* (2020.02)

(58) Field of Classification Search

CPC ..... B60W 2050/146; B60W 2420/403; B60W 2540/225; B60K 35/28; B60K 2360/178; B60K 2360/1868; B60K 2360/188; G06V 20/597

See application file for complete search history.

(56) References Cited

U.S. PATENT DOCUMENTS

| | | | | |
|---|---|---|---|---|
| 10,232,713 | B2 | 3/2019 | Kim | |
| 10,452,930 | B2 * | 10/2019 | Sato | B60K 35/60 |
| 10,723,264 | B2 | 7/2020 | Fujisawa et al. | |
| 11,752,939 | B2 | 9/2023 | Hayashi et al. | |
| 11,873,007 | B2 | 1/2024 | Tamori | |
| 2017/0287186 | A1 * | 10/2017 | Saito | G06T 11/60 |
| 2018/0086346 | A1 | 3/2018 | Fujisawa et al. | |
| 2018/0118109 | A1 | 5/2018 | Fujisawa et al. | |
| 2018/0297470 | A1 | 10/2018 | Kim | |
| 2018/0336423 | A1 * | 11/2018 | Ban | B60W 50/14 |
| 2020/0231182 | A1 * | 7/2020 | Oba | G05D 1/0061 |
| 2021/0039638 | A1 | 2/2021 | Yasui | |
| 2021/0291736 | A1 | 9/2021 | Higashiyama et al. | |
| 2021/0339770 | A1 | 11/2021 | Tamori | |
| 2022/0080888 | A1 * | 3/2022 | Hayashi | B60K 35/285 |
| 2023/0415735 | A1 | 12/2023 | Yasui | |

FOREIGN PATENT DOCUMENTS

| | | | |
|---|---|---|---|
| JP | 2013-242615 | A | 12/2013 |
| JP | 2020-194499 | A | 12/2020 |
| JP | 2021-026720 | A | 2/2021 |
| JP | 2021-149319 | A | 9/2021 |
| WO | 2016/157892 | A1 | 10/2016 |
| WO | 2020/100585 | A1 | 5/2020 |
| WO | 2023/100741 | A1 | 6/2023 |

* cited by examiner

F I G. 2
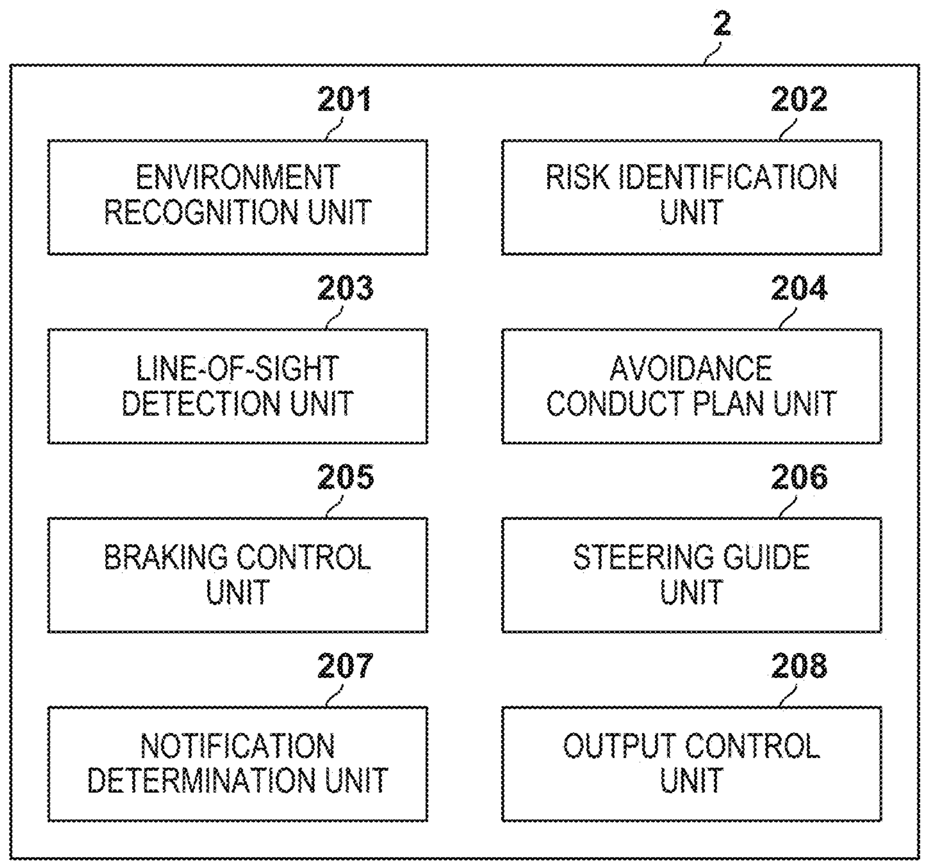

F I G. 4A
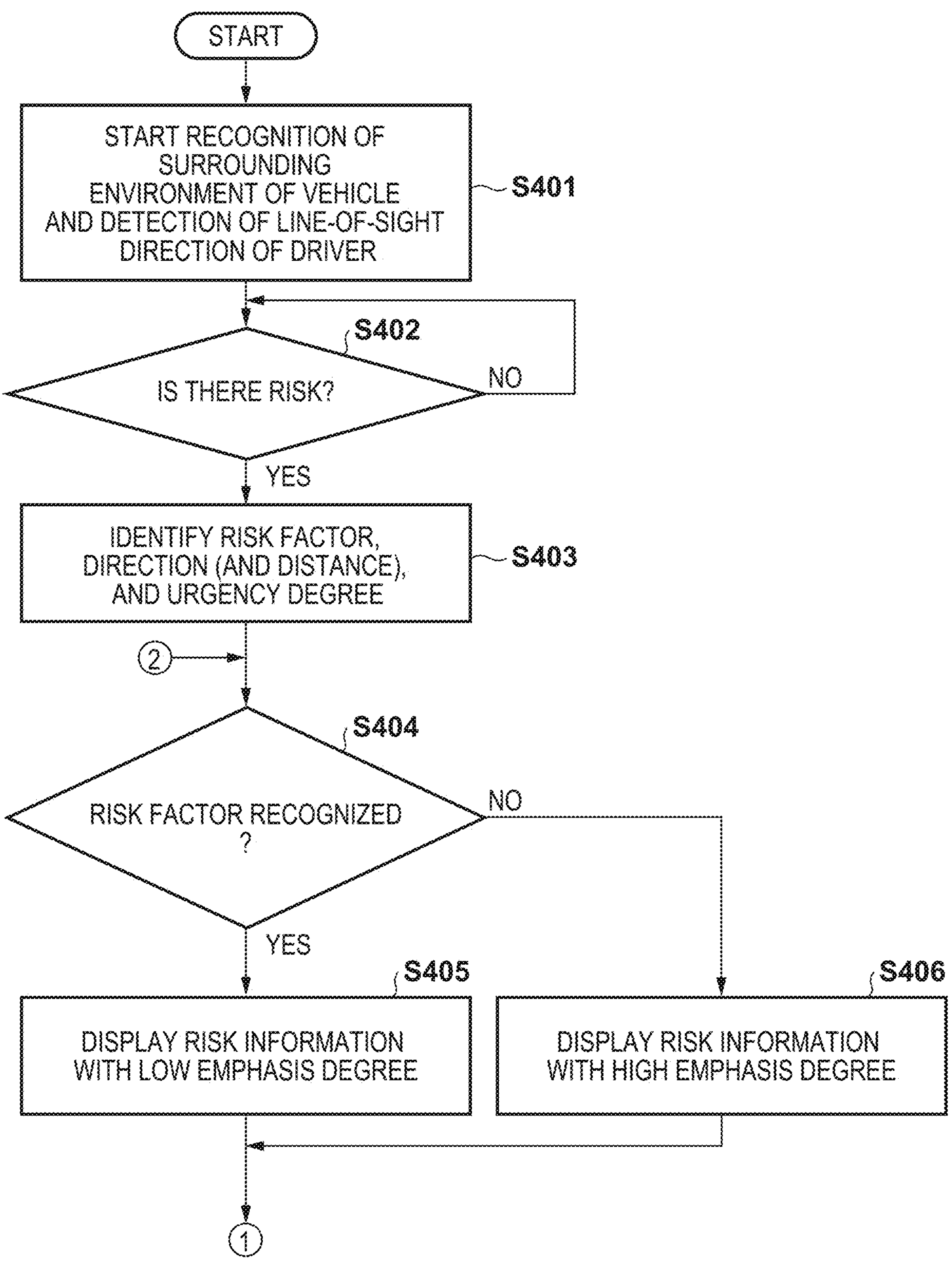

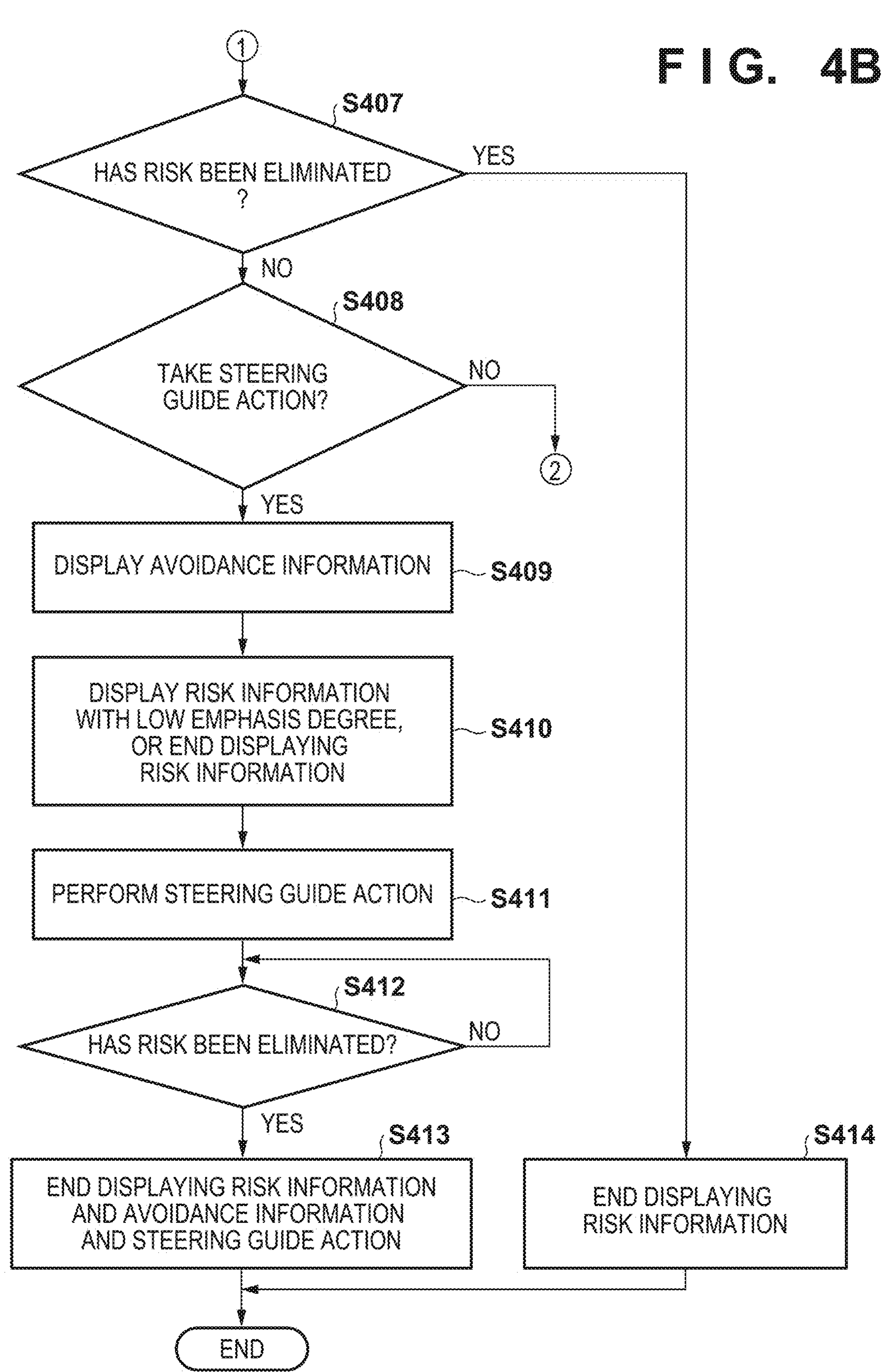
FIG. 4B
1
S407
HAS RISK BEEN ELIMINATED ?
YES
NO
S408
TAKE STEERING GUIDE ACTION?
NO
2
YES
DISPLAY AVOIDANCE INFORMATION
S409
DISPLAY RISK INFORMATION WITH LOW EMPHASIS DEGREE, OR END DISPLAYING RISK INFORMATION
S410
PERFORM STEERING GUIDE ACTION
S411
S412
HAS RISK BEEN ELIMINATED?
NO
YES
S413
END DISPLAYING RISK INFORMATION AND AVOIDANCE INFORMATION AND STEERING GUIDE ACTION
S414
END DISPLAYING RISK INFORMATION
END

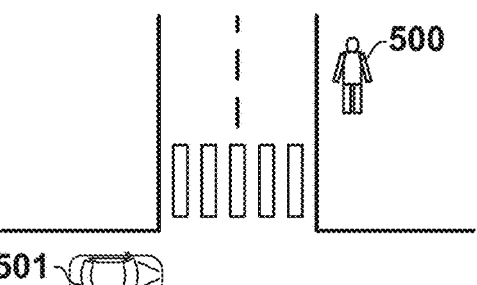
FIG. 5A
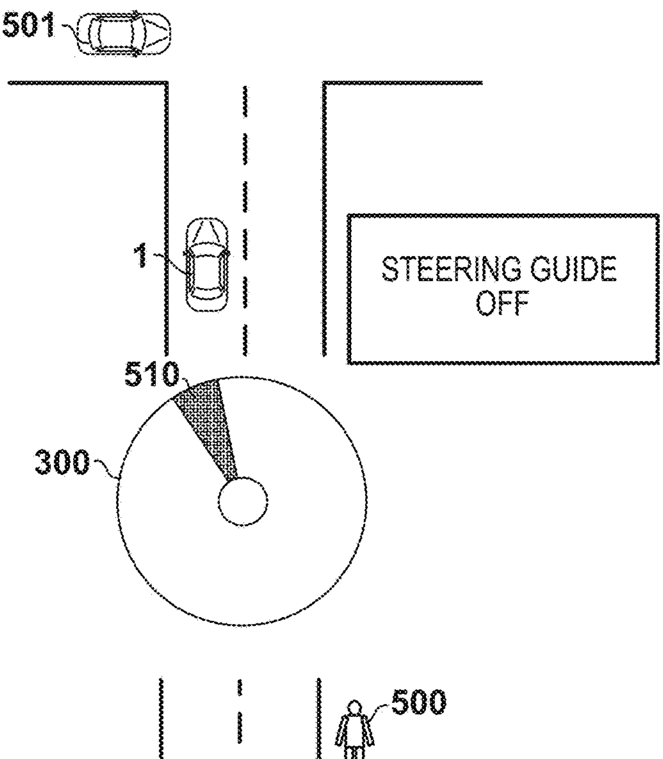
FIG. 5B
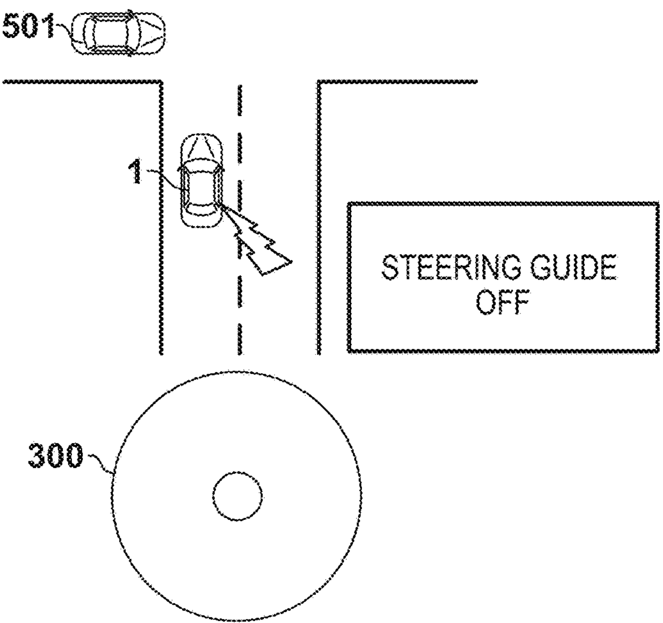

FIG. 6B 600
603
1
STEERING GUIDE OFF
310

600
603
1
STEERING GUIDE OFF
616
614
615
310

FIG. 8C 801
803
1
STEERING GUIDE OFF
812
810
310

FIG. 8D 801
1
STEERING GUIDE OFF
812
813
310

FIG. 9A
801
1
STEERING GUIDE
ON
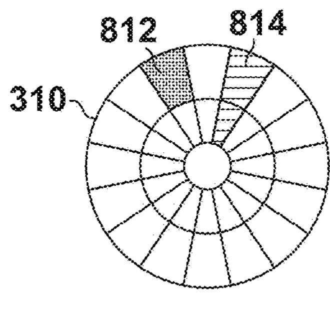
FIG. 9B
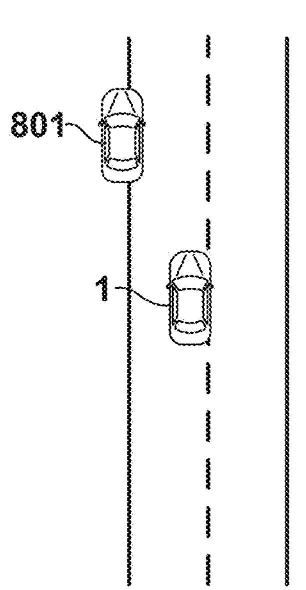
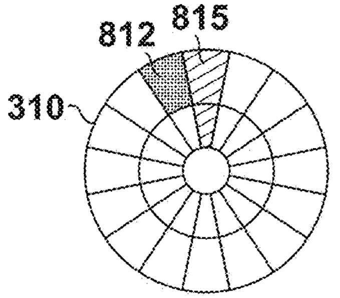

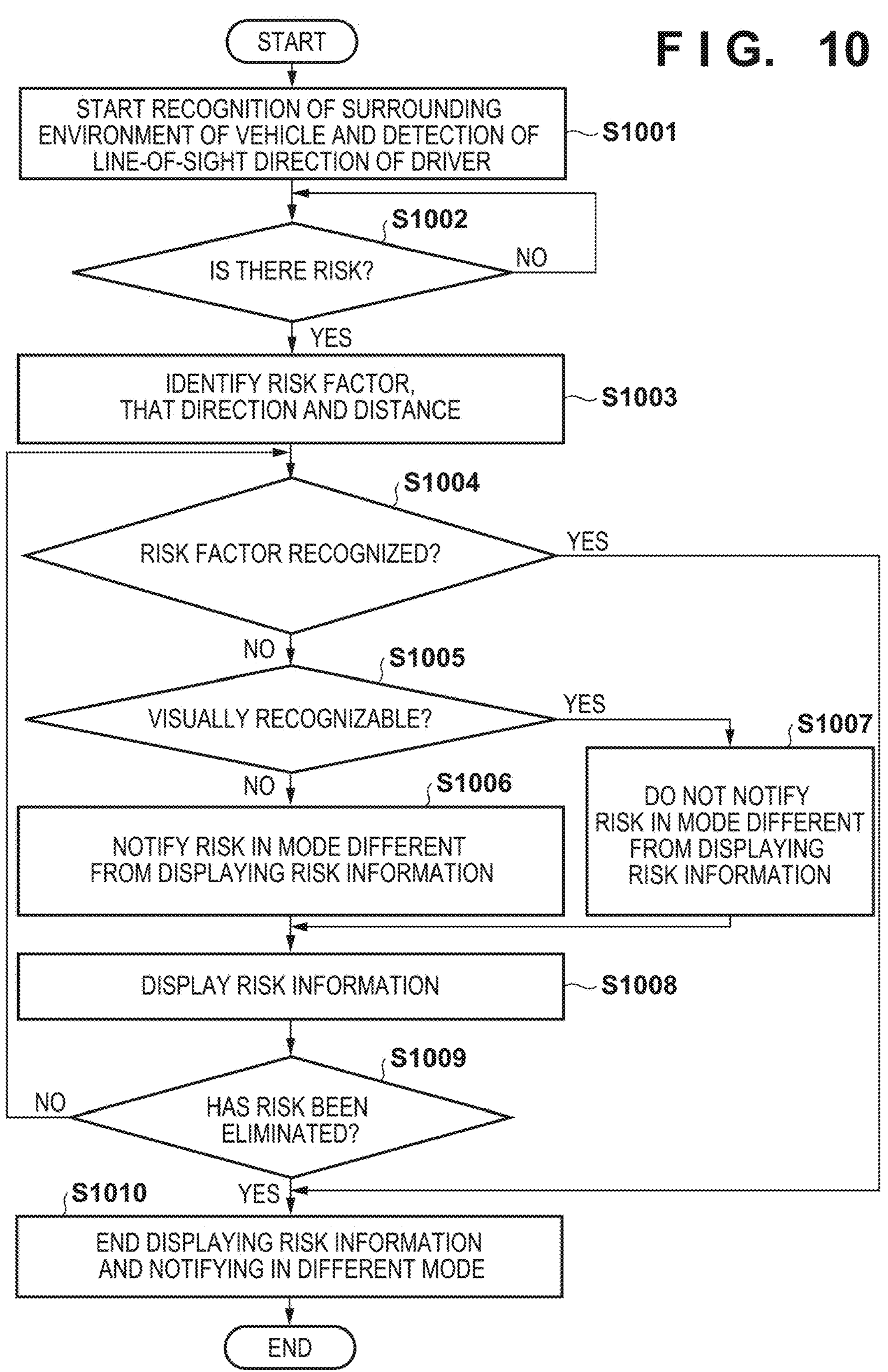
FIG. 10
START
START RECOGNITION OF SURROUNDING ENVIRONMENT OF VEHICLE AND DETECTION OF LINE-OF-SIGHT DIRECTION OF DRIVER
S1001
S1002
IS THERE RISK?
NO
YES
IDENTIFY RISK FACTOR, THAT DIRECTION AND DISTANCE
S1003
S1004
RISK FACTOR RECOGNIZED?
YES
NO
S1005
VISUALLY RECOGNIZABLE?
YES
S1007
NO
S1006
NOTIFY RISK IN MODE DIFFERENT FROM DISPLAYING RISK INFORMATION
DO NOT NOTIFY RISK IN MODE DIFFERENT FROM DISPLAYING RISK INFORMATION
DISPLAY RISK INFORMATION
S1008
S1009
NO
HAS RISK BEEN ELIMINATED?
S1010
YES
END DISPLAYING RISK INFORMATION AND NOTIFYING IN DIFFERENT MODE
END 1102
1103
1101
1

1105
300

1103
1104
1102
1101
31
300
82
91L
91R

VEHICLE, CONTROL DEVICE AND CONTROL METHOD THEREFOR

CROSS-REFERENCE TO RELATED APPLICATION(S)

This application is a continuation of International Patent Application No. PCT/JP2022/043369 filed on Nov. 24, 2022, which claims priority to and the benefit of Japanese Patent Application No. 2021-195610 filed on Dec. 1, 2021 and Japanese Patent Application No. 2021-195618 filed on Dec. 1, 2021, the entire disclosures of which are incorporated herein by reference.

BACKGROUND OF THE INVENTION

Field of the Invention

The present invention relates to a vehicle, a control device, and a control method therefor.

Description of the Related Art

Various techniques for enhancing safety of vehicles have been proposed. International Publication No. 2020/100585 describes detecting a line-of-sight direction of a driver of a vehicle and controlling the vehicle to be in a safe state, when the driver does not face a direction that the driver has to face while driving. In order to avoid a risk that occurs to the vehicle, it is conceivable to indicate the direction to which the vehicle has to advance for the driver. However, depending on the way of presenting such information, the driver does not be able to intuitively determine to which direction the driver has to advance the vehicle, in some cases.

SUMMARY OF THE INVENTION

According to an aspect of the present disclosure, steering by a driver is guided to avoid a risk. According to some embodiments, a control device for controlling a vehicle including a display device and a steering operation element, the control device comprising: a risk identification unit configured to identify a risk factor present in surroundings of the vehicle and a direction of the risk factor with respect to the vehicle; a display control unit configured to display, on the display device, risk information indicating the direction of the risk factor with a first emphasis degree; and a guidance control unit configured to take a guidance action using the steering operation element, the guidance action guiding a driver of the vehicle to operate the steering operation element to avoid the risk factor, wherein when the guidance control unit takes the guidance action using the steering operation element, the display control unit displays, on the display device, avoidance information indicating an advancing direction of the vehicle to avoid the risk factor, and the display control unit displays the risk information with a second emphasis degree lower than the first emphasis degree, or does not display the risk information, is provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 2 is a block diagram for describing a functional configuration example of a control device according to an embodiment;

FIG. 4A is a flowchart for describing a control method according to an embodiment;

FIG. 4B is a flowchart for describing the control method according to an embodiment;

FIG. 5A is a schematic diagram for describing various examples of the control method according to an embodiment;

FIG. 5B is a schematic diagram for describing various examples of the control method according to an embodiment;

FIG. 5C is a schematic diagram for describing various examples of the control method according to an embodiment;

FIG. 5D is a schematic diagram for describing various examples of the control method according to an embodiment;

FIG. 6A is a schematic diagram for describing various examples of a control method according to an embodiment;

FIG. 6B is a schematic diagram for describing various examples of the control method according to an embodiment;

FIG. 7A is a schematic diagram for describing various examples of a control method according to an embodiment;

FIG. 7B is a schematic diagram for describing various examples of the control method according to an embodiment;

FIG. 8A is a schematic diagram for describing various examples of a control method according to an embodiment;

FIG. 8B is a schematic diagram for describing various examples of the control method according to an embodiment;

FIG. 8C is a schematic diagram for describing various examples of the control method according to an embodiment;

FIG. 8D is a schematic diagram for describing various examples of the control method according to an embodiment;

FIG. 9A is a schematic diagram for describing various examples of a control method according to an embodiment;

FIG. 9B is a schematic diagram for describing various examples of the control method according to an embodiment;

FIG. 10 is a flowchart for describing a control method according to an embodiment;

DESCRIPTION OF THE EMBODIMENTS

Figure 1:
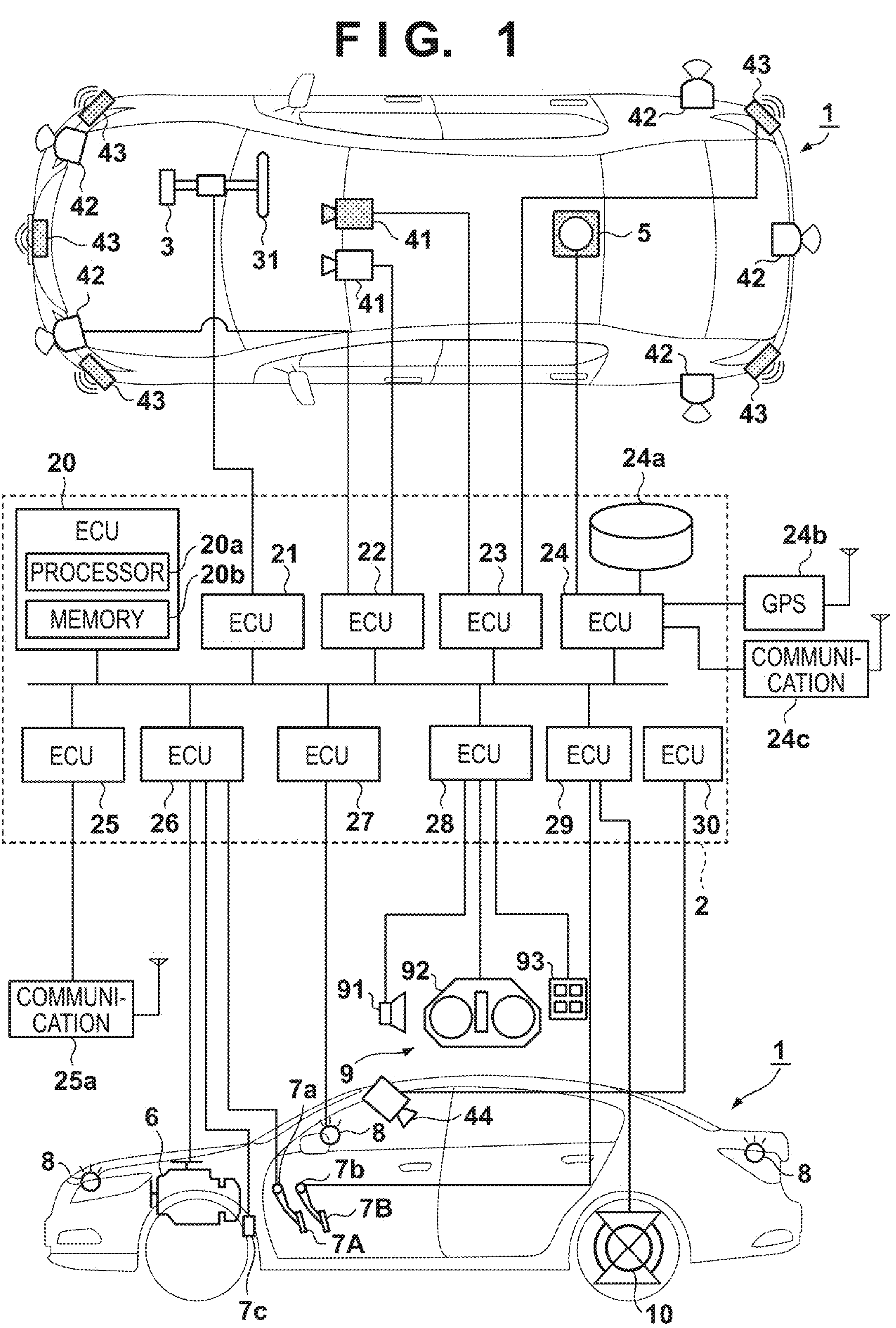
FIG. 1 is a block diagram for describing a hardware configuration example of a vehicle according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

FIG. 1 is a block diagram of a vehicle 1 according to an embodiment of the present disclosure. In FIG. 1, the vehicle 1 is schematically illustrated in a plan view and in a side view. The vehicle 1 is, for example, a sedan-type four-wheeled passenger vehicle. The vehicle 1 may be such a four-wheeled vehicle, a two-wheeled vehicle, or any other type of vehicle.

The vehicle 1 includes a vehicle control device 2 (hereinafter, simply referred to as a control device 2) that controls the vehicle 1. The control device 2 includes a plurality of ECUs 20 to 30 communicably connected through an in-vehicle network. Each ECU includes a processor represented by a central processing unit (CPU), a memory such as a semiconductor memory, an interface with an external device, and the like. The memory stores programs executed by the processor, data used for processing by the processor, and the like. Each of the ECUs may include a plurality of processors, memories, interfaces, and the like. For example, the ECU 20 includes a processor 20*a* and a memory 20*b*. Processing by the ECU 20 is performed by the processor 20*a* executing instructions included in a program stored in the memory 20*b*. Instead of this, the ECU 20 may include a dedicated integrated circuit such as an ASIC to perform the processing by the ECU 20. A similar configuration applies to the other ECUs.

Hereinafter, functions and the like to be performed by the respective ECUs 20 to 30 will be described. Note that the number of ECUs and functions to be performed can be designed as appropriate, and can be subdivided or integrated as compared with the present embodiment.

The ECU 20 conducts control related to automated traveling of the vehicle 1. In the automated driving, at least one of steering and acceleration or deceleration of the vehicle 1 is automatically controlled. The automated traveling by the ECU 20 may include automated traveling that does not require a traveling operation by the driver of the vehicle 1 (hereinafter, simply referred to as a driver) (may also be referred to as automated driving) and automated traveling for assisting the traveling operation by the driver (may also be referred to as driving assistance).

The ECU 21 controls an electric power steering device 3. The electric power steering device 3 includes a mechanism for steering the front wheel in accordance with a driver's driving operation (steering operation) on a steering wheel 31. The steering wheel 31 is an example of a steering operation element. In addition, the electric power steering device 3 includes a motor that exerts driving force for assisting the steering operation or automatically steering the front wheels, a sensor that detects a steering angle, and the like. In a case where the driving state of the vehicle 1 is the automated driving, the ECU 21 automatically controls the electric power steering device 3 in response to an instruction from the ECU 20, and controls an advancing direction of the vehicle 1.

The ECUs 22 and 23 control detection units 41 to 43, each of which detects a surrounding situation of the vehicle, and performs information processing on detection results. The detection unit 41 (hereinafter, referred to as the camera 41, in some cases) is a camera that captures an image on a forward side of the vehicle 1, and is attached to the vehicle interior side of a windshield at a front part of a roof of the vehicle 1 in the present embodiment. By analyzing the image that has been captured by the camera 41, it is possible to extract a contour of an object or extract a lane marker (white line or the like) of a lane on a road.

The detection unit 42 is a light detection and ranging (LiDAR) (hereinafter, referred to as the LiDAR 42, in some cases) that detects a target object in the surrounding of the vehicle 1 and that measures the distance to a target object, for example. In the present embodiment, five LiDARs 42 are provided, including one at each corner portion of the front part of the vehicle 1, one at the center of the rear portion of the vehicle 1, and one at each lateral side of a rear part of the vehicle 1. The detection unit 43 is a millimeter-wave radar (hereinafter, referred to as the radar 43, in some cases) that detects a target object in the surrounding of the vehicle 1 and that measures the distance to the target object, for example. In the present embodiment, five radars 43 are provided, including one at the center of the front part of the vehicle 1, one at each corner of the front part of the vehicle 1, and one at each corner of the rear part of the vehicle 1.

The ECU 22 controls one camera 41 and each LiDAR 42, and performs information processing on detection results. The ECU 23 controls the other camera 41 and each radar 43, and performs information processing on detection results. By providing two sets of devices for detecting the surrounding situation of the vehicle, the reliability of the detection results can be improved, and in addition, by providing different types of detection units such as a camera, a LiDAR, and a radar, the surrounding environment of the vehicle can be analyzed in multiple ways.

The ECU 24 controls a gyro sensor 5, a global positioning system (GPS) sensor 24*b*, and a communication device 24*c*, and performs information processing on detection results or communication results. The gyro sensor 5 detects a rotational movement of the vehicle 1. It becomes possible to determine the course of the vehicle 1, based on a detection result of the gyro sensor 5, a wheel speed, and the like. The GPS sensor 24*b* detects a current location of the vehicle 1. The communication device 24*c* performs wireless communication with a server that provides map information and traffic information, and acquires pieces of these information. The ECU 24 is capable of accessing a map information database 24*a*, which is constructed in a memory, and the ECU 24 performs route search and the like from the current location to a destination. The ECU 24, the map information database 24*a*, and the GPS sensor 24*b* constitute a so-called navigation device.

The ECU 25 includes a communication device 25*a* for inter-vehicle communication. The communication device 25*a* performs wireless communication with other surrounding vehicles to exchange information between the vehicles.

The ECU 26 controls a power plant 6. The power plant 6 is a mechanism that outputs driving force for rotating driving wheels of the vehicle 1, and includes, for example, an engine and a transmission. For example, the ECU 26 controls the output of the engine in response to a driver's driving operation (an accelerator operation or an acceleration operation) that has been detected by an operation detection sensor 7*a*, which is provided on an accelerator pedal 7A, or switches a gear ratio of the transmission, based on information such as a vehicle speed that has been detected by a vehicle speed sensor 7*c*. In a case where the driving state of the vehicle 1 is the automated driving, the ECU 26 automatically controls the power plant 6 in response to an instruction from the ECU 20, and controls acceleration or deceleration of the vehicle 1.

The ECU 27 controls lighting devices (headlights, taillights, and the like) including direction indicators 8 (blinkers). In the example of FIG. 1, the direction indicators 8 are respectively provided at the front part, door mirrors, and the rear part of the vehicle 1.

The ECU 28 controls an input and output device 9. The input and output device 9 outputs information to the driver, and receives information input from the driver. A sound output device 91 notifies the driver of information by sounds. A display device 92 notifies the driver of information by displaying images. The display device 92 is disposed, for example, in front of a driver's seat, and constitutes an instrument panel or the like. Note that although the sounds and the display have been given as examples here, information may be notified by vibration or light. In addition, information may be notified by a combination of two or more of the sounds, the display, the vibration, and the light. Furthermore, the combination or the mode of notification may be changed depending on the level (for example, an urgency degree) of information to be notified. An input device 93 is a group of switches that are disposed at positions for the driver to be able to operate and give an instruction to the vehicle 1, but may also include a voice input device.

The ECU 29 controls a brake device 10 and a parking brake (not illustrated). The brake device 10 is, for example, a disc brake device, and is provided on each wheel of the vehicle 1 to apply resistance against rotations of the wheels to decelerate or stop the vehicle 1. The ECU 29 controls the activation of the brake device 10 in response to a driver's driving operation (a braking operation) that has been detected by an operation detection sensor 7*b*, which is provided on a brake pedal 7B, for example. When the driving state of the vehicle 1 is the automated driving, the ECU 29 automatically controls the brake device 10 in response to an instruction from the ECU 20 to control the vehicle 1 to be decelerated and stopped. The brake device 10 and the parking brake can also be activated to keep the vehicle 1 in the stopped state. In addition, in a case where the transmission of the power plant 6 includes a parking lock mechanism, it is also possible to activate the parking lock mechanism to keep the stopped state of the vehicle 1.

The ECU 30 controls a driver camera 44. The driver camera 44 is attached to a position where images of the driver (in particular, the driver's face) are captured. By analyzing the images of the driver that have been captured by the driver camera 44, the ECU 30 identifies a state of the driver. For example, the ECU 30 may identify a line-of-sight direction of the driver, based on a direction of the face and a position of the pupil of the driver. In addition, the ECU 30 may identify that the driver is dozing, based on whether the driver's eyes are open, movements of the head, or the like.

Functional blocks of the control device 2 of the vehicle 1 will be described with reference to FIG. 2. The control device 2 may include a plurality of functional blocks illustrated in FIG. 2. Each functional block of the control device 2 may be enabled by one or more of the ECUs 20 to 30 of the control device 2 that have been described in FIG. 1. Specifically, the operation by each functional block may be enabled by one or more CPUs (for example, the CPU 20*a*) of the ECUs 20 to 30 executing instructions of a program stored in a corresponding memory (for example, the memory 20*b*). In addition to this or instead of this, the operation by each functional block may be enabled by a dedicated circuit such as an application specific integrated circuit (ASIC) or a field programmable gate array (FPGA).

An environment recognition unit 201 recognizes an environment in the surroundings of the vehicle 1, based on detection results by the detection units 41 to 43. The surroundings of the vehicle 1 may denote detection ranges of the detection unit 41 to 43. The environment in the surroundings of the vehicle 1 includes, for example, a static structure and a traffic participant. The static structure includes roads (including lane markers, crosswalks, road shapes, and the like) and objects permanently or semi-permanently installed on the roads, for example, traffic lights, traffic signs, and the like. The traffic participant includes vehicles other than the vehicle 1 (including four-wheeled vehicles and two-wheeled vehicles), bicycles, pedestrians, and the like. The traffic participant may include both traffic participants that are moving (for example, vehicles that are traveling and pedestrians who are walking) and traffic participants that are stationary (for example, vehicles that are temporarily stopped, vehicles that are stopped, and pedestrians who are standing still). The recognition of the surrounding environment of the vehicle 1 may include recognition of a location, a size, a moving direction, a moving speed, and the like of the above-described object. The surrounding environment may be recognized by the environment recognition unit 201 using, for example, an existing technology, and its detailed description will be omitted.

A risk identification unit 202 identifies a risk factor present in the surroundings of the vehicle 1 and a direction of the risk factor with respect to the vehicle 1, based on the environment in the surroundings of the vehicle 1 that has been recognized by the environment recognition unit 201 and a current behavior of the vehicle 1 (for example, the speed, the acceleration, the advancing direction, or the like of the vehicle 1). The risk identification unit 202 may further identify a distance from the vehicle 1 to the risk factor. The risk factor denotes a factor that gives a risk to the vehicle 1 with a possibility equal to or larger than a threshold. The risk to be received by the vehicle 1 may include the vehicle 1 contacting an object present in the surroundings of the vehicle 1. In a case where the possibility that the vehicle 1 comes into contact with an object present in the surroundings of the vehicle 1 is equal to or larger than the threshold (for example, equal to or larger than 30%), the risk identification unit 202 may identify such an object as a risk factor. The vehicle 1 contacting the object may include a collision of the vehicle 1 with the object. Furthermore, the risk to be received by the vehicle 1 may be a risk other than contact, for example, the vehicle 1 entering a travel prohibited area or the vehicle 1 falling over from a cliff. In such an example, the travel prohibited area or the cliff is the risk factor.

The risk factor may be a traffic participant present in the surroundings of the vehicle 1. For example, when it is determined that there is a possibility that a pedestrian jumps out onto the course of the vehicle 1, the risk identification unit 202 may identify such a pedestrian as the risk factor. The risk factor may be an object installed on a road. For example, when there are roadworks on a forward side in the lane in which the vehicle 1 is traveling, the risk identification unit 202 may identify a tool used for the roadworks (for example, an off-limits sign or the like) as the risk factor. The risk identification unit 202 may calculate the possibility of giving a disadvantage to the vehicle 1, based on a predicted location in the future (for example, in 30 seconds from the current point in time (calculation point in time)) of an object present in the surroundings of the vehicle 1 and a predicted location in the future of the vehicle 1.

The risk identification unit 202 may determine an urgency degree of the risk. The urgency degree of the risk denotes an index indicating how long the vehicle 1 has enough time in order to avoid the risk. For example, when an object that has a possibility of coming into contact with the vehicle 1 is identified as a risk factor, the urgency degree of the risk may be determined, based on a predicted time until the vehicle 1 comes into contact with the object. The risk factor, the direction and the distance to the risk factor, and the urgency degree of the risk may be identified by the risk identification unit 202 using, for example, an existing technology, and its detailed description will be omitted.

A line-of-sight detection unit 203 detects a line-of-sight direction of the driver, by analyzing the image that has been obtained by the driver camera 44. The line of sight may be detected by the line-of-sight detection unit 203 using, for example, an existing technology, and its detailed description will be omitted.

An avoidance conduct plan unit 204 determines behavior that the vehicle 1 has to do in order to avoid the risk factor, based on the environment in the surroundings of the vehicle 1 that has been recognized by the environment recognition unit 201, the current behavior of the vehicle 1 (for example, the speed, the acceleration, the advancing direction, or the like of the vehicle 1), and the risk factor, the direction to the risk factor, and the urgency degree of the risk factor that have been identified by the risk identification unit 202. The behavior that the vehicle 1 has to do may include acceleration, deceleration, or maintaining the speed of the vehicle 1, and bringing the vehicle 1 into a specific steering state.

For example, in a case where there is a risk factor on a forward side of the vehicle 1 and a predicted time is long (for example, equal to or longer than ten seconds) until the vehicle 1 comes into contact with the risk factor, the avoidance conduct plan unit 204 may determine that the vehicle 1 has to decelerate. In a case where there is a risk factor on an obliquely forward left side of the vehicle 1 and the predicted time is short (for example, equal to or shorter than five seconds) until the vehicle 1 comes into contact with the risk factor, the avoidance conduct plan unit 204 may determine that the vehicle 1 has to turn to the right while decelerating. In a case where there are risk factors on both sides of the vehicle 1 (for example, the vehicle 1 is interposed between a wall and a cliff), the avoidance conduct plan unit 204 may determine that the vehicle 1 has to keep traveling straight. The behavior may be determined by the avoidance conduct plan unit 204 using, for example, an existing technology, and its detailed description will be omitted.

A braking control unit 205 controls braking of the vehicle 1. For example, in a case where the avoidance conduct plan unit 204 determines that the vehicle 1 has to be decelerated, the braking control unit 205 may automatically (that is, even though the brake pedal 7B is not operated) brake the vehicle 1 to decelerate or stop the vehicle 1.

A steering guide unit 206 takes a steering guide action using a steering operation element of the vehicle 1. The steering guide action denotes an action for guiding the driver to operate the steering operation element to avoid a risk factor. Hereinafter, the steering wheel 31 of FIG. 1 will be described as an example of a steering operation element of the vehicle 1. For example, it is assumed that the avoidance conduct plan unit 204 determines that the vehicle 1 has to turn to the right. In this case, in order to guide the driver to rotate the steering wheel 31 to the right, the steering guide unit 206 may take the following action.

For example, the steering guide unit 206 may vibrate a specific part on the right side of the steering wheel 31 for a predetermined time (for example, one second or three seconds) to prompt the driver to rotate the steering wheel 31 to the right. The steering guide unit 206 may vibrate only once, may vibrate a plurality of times (for example, three times) at a predetermined interval (for example, five seconds), or may repeatedly vibrate until the risk factor is eliminated. By applying force of a rotation direction (the right rotation direction, in this example) to the steering wheel 31, the steering guide unit 206 may prompt the driver to rotate the steering wheel 31 to the right. The force of the rotation direction may be force with which the steering wheel 31 rotates by a predetermined amount (for example, one degree, five degrees, ten degrees, or the like), in a case where the driver does not grip the steering wheel 31. In a case where the driver grips the steering wheel 31, the steering wheel 31 may actually rotate, or may not necessarily rotate. By applying such force to the steering wheel 31, the driver feels the force in a specific rotation direction from the steering wheel 31. In a case where the steering wheel 31 is actually rotated by applying the force of the rotation direction to the steering wheel 31, the steering guide unit 206 may apply force of a reverse rotation direction to the steering wheel 31 to return the rotation, or may not necessarily apply the force of the reverse rotation direction. The steering guide unit 206 may apply the force of the rotation direction to the steering wheel 31 only once, may apply the force a plurality of times (for example, three times) at a predetermined interval (for example, five seconds), or may repeatedly apply the force until the risk factor is eliminated. The steering guide unit 206 may reduce the torque for rotating the steering wheel 31 to the right, so that the driver can easily rotate the steering wheel 31 to the right. The steering guide unit 206 may take a combination of some or all of these actions, as the steering guide action. In a case where the avoidance conduct plan unit 204 determines that the vehicle 1 has to turn to the left, the steering guide unit 206 may take an action in a direction opposite to the above-described action.

It is assumed that the avoidance conduct plan unit 204 determines that the vehicle 1 has to travel straight (that is, should not turn to any direction). In this case, the steering guide unit 206 may increase the torque for rotating the steering wheel 31. In order to guide the driver so that the steering state of the vehicle 1 becomes a state in which straight traveling and turning to the right are only permitted, but turning to the left is not permitted, the steering guide unit 206 may increase only the torque for rotating the steering wheel 31 to the left.

A notification determination unit 207 determines whether to notify the driver of information, and determines its content and a notification method in notifying the driver of the information. For example, in a case where a risk factor is present in the surroundings of the vehicle 1, the notification determination unit 207 may determine to notify the driver of a direction of the risk factor. In addition, the notification determination unit 207 may determine to notify the driver of a distance from the vehicle 1 to the risk factor. Furthermore, the notification determination unit 207 may determine to notify the advancing direction of the vehicle 1 in order to avoid the risk factor. Details of the information notified to the driver will be described later.

An output control unit 208 controls actions of devices for notifying the driver of information, specifically, the sound output device 91 and the display device 92, which have been described above. For example, the output control unit 208 outputs information that has been determined to be notified by the notification determination unit 207 to the driver via the sound output device 91 and/or the display device 92.

The display device 92 for displaying information to the driver will be described with reference to FIGS. 3A to 3C. The display device 92 is capable of displaying information indicating the direction with respect to the vehicle 1. Furthermore, the display device 92 may be capable of displaying information indicating the distance from the vehicle 1. The display device 92 may be any display device capable of displaying these pieces of information. For example, the display device 92 may be a dot-matrix display attached to an instrument panel of the vehicle 1. In addition, the display device 92 may be an aggregation of a plurality of light-emitting units capable of emitting light in a specific shape. Furthermore, the display device 92 may be a head-up display.

Figure 3A:
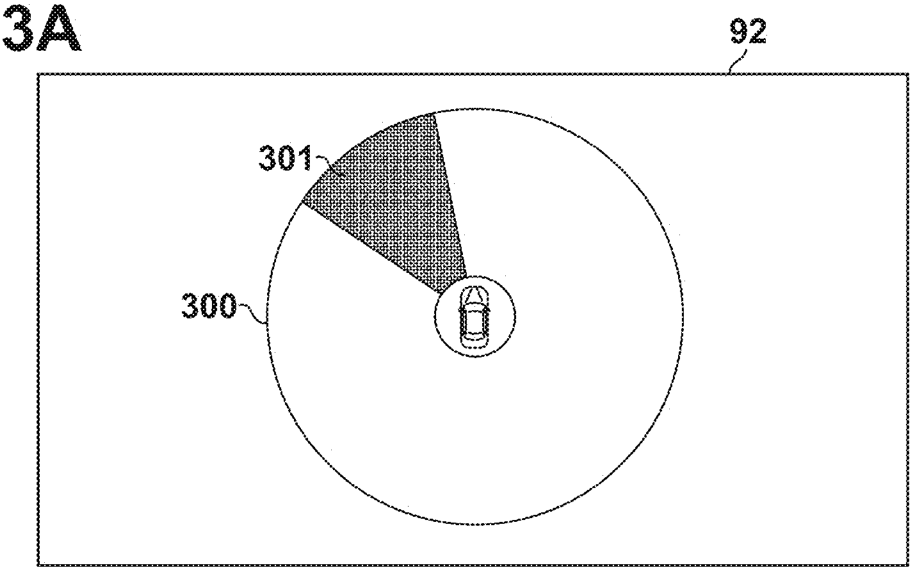
FIG. 3A is a schematic diagram for describing a display example of a display device according to an embodiment.

The display device 92 may include a display area 300 having a circular shape as illustrated in FIG. 3A in order to indicate the direction with respect to the vehicle 1. The display area 300 occupies a part of the display device 92. The display device 92 is capable of displaying a fan-shaped indicator in an optional position in the display area 300. When the indicator is not displayed, the display area 300 is displayed in a base color (for example, white or black). The indicator is displayed to be distinguishable from any part other than the indicator in the display area 300. For example, the indicator is displayed in a color (for example, red or blue) different from the base color, and parts other than the indicator are displayed in the base color. Instead of this or in addition to this, the indicator may be displayed by blinking a specific part.

The indicator in the display area 300 indicates the direction with respect to the vehicle 1. For example, the position of the indicator with respect to the center of the display area 300 may correspond to the direction with respect to the vehicle 1. In the example of FIG. 3A, the upward direction in the drawing corresponds to the forward side of the vehicle 1, the downward direction in the drawing corresponds to the rearward side of the vehicle 1, the rightward direction in the drawing corresponds to the lateral right side of the vehicle 1, and the leftward direction in the drawing corresponds to the lateral left side of the vehicle 1. FIG. 3A illustrates an indicator 301 as an example of the indicator. The indicator 301 may be displayed in red, for example. The indicator 301 indicates an obliquely forward left side of the vehicle 1.

The display device 92 may display all the indicators in the same color, or may display each indicator in a color selected from a plurality of colors. In addition, the display device 92 may display all the indicators with the same emphasis degree, or may display each indicator with an emphasis degree selected from a plurality of emphasis degrees. The emphasis degree is an index indicating ease of attracting attention of the driver. As the emphasis degree is higher, the attention of the driver is more easily attracted. For example, the display device 92 may display the indicator with different density or luminance. As the density or luminance is higher, the emphasis degree is higher. For example, dark red is more likely to attract the attention of the driver than light red. Instead of this or in addition to this, the display device 92 may display the indicator in a different mode. For example, the display device 92 may blink the indicator to increase the emphasis degree of the indicator.

Figure 3B:
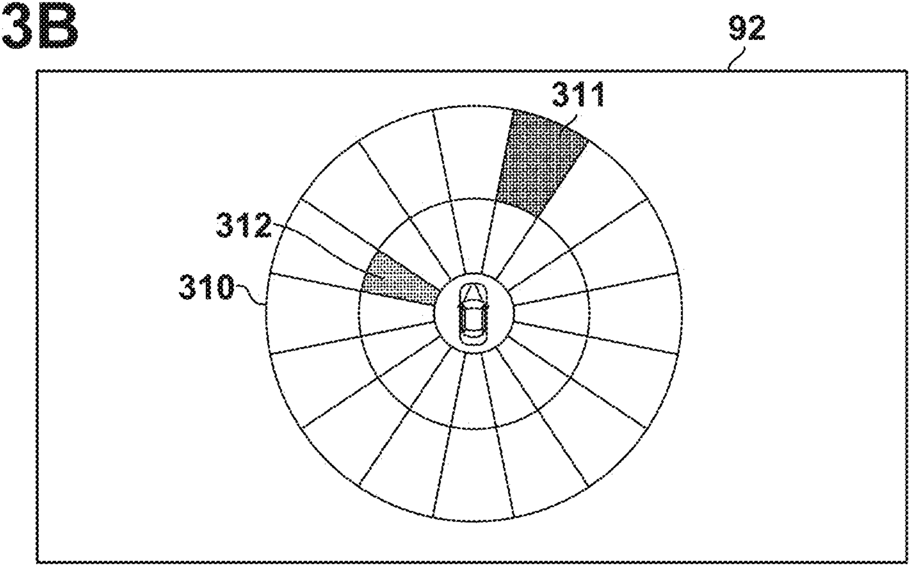
FIG. 3B is a schematic diagram for describing a display example of the display device according to an embodiment.

The display device 92 may include a display area 310 having a circular shape as illustrated in FIG. 3B to indicate the direction with respect to the vehicle 1 and the distance from the vehicle 1. Hereinafter, differences between the display area 300 and the display area 310 will be mainly described. The entire circumference (that is, 360 degrees) of the display area 310 is divided into 16 sections each having a fan shape, and each fan shape is divided into two segments, including a segment close to the center and a segment far from the center. Therefore, the display area 310 includes 32 segments respectively having different directions and distances from the center. The display device 92 displays the indicator by using one or more of 32 segments of the display area 310.

Similarly to the display area 300, the indicator in the display area 310 indicates the direction with respect to vehicle 1. For example, the position of the indicator with respect to the center of the display area 310 may correspond to the direction with respect to the vehicle 1. Furthermore, the indicator in the display area 310 indicates the distance from the vehicle 1. For example, a (close or far) distance of the indicator from the center of the display area 310 may correspond to the distance from the vehicle 1. In the example of the display area 310, the distance from the vehicle 1 is indicated in two levels, but may be indicated in three or more stages.

FIG. 3B illustrates indicators 311 and 312 each serving as an example of the indicator. The indicator 311 indicates a far position on an obliquely forward right side of the vehicle 1. The indicator 311 may be displayed in dark red, for example. The indicator 312 indicates a close position on a lateral left side of the forward side of the vehicle 1. The indicator 312 may be displayed in light red, for example. In this example, the emphasis degree of the indicator 311 is higher than the emphasis degree of the indicator 312.

Figure 3C:
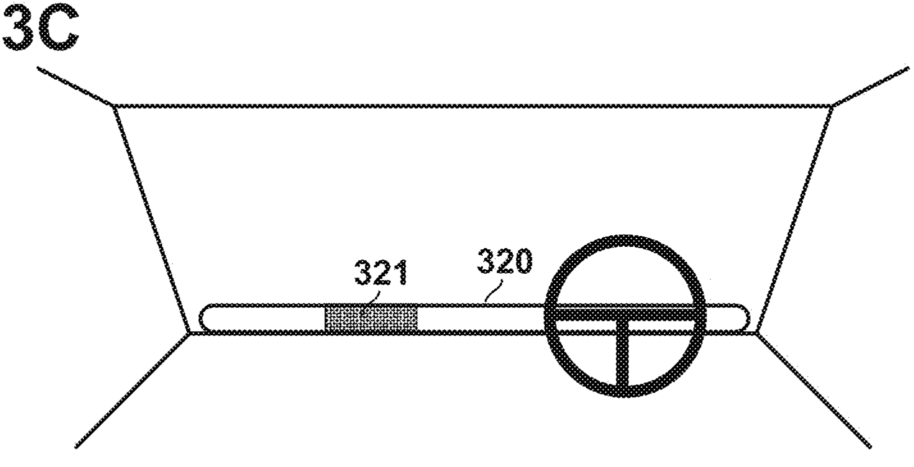
FIG. 3C is a schematic diagram for describing a display example of the display device according to an embodiment.

The display device 92 may include a light-emitting diode (LED) line 320 as illustrated in FIG. 3C to indicate the direction with respect to the vehicle 1. The LED line 320 may include a plurality of LEDs arranged in a line. The display device 92 is capable of turning on a selected part of the LED line 320, and such a turned-on part serves as an indicator. The LED line 320 is installed in a lower part of the windshield of the vehicle 1. The indicator of the LED line 320 and the direction with respect to the vehicle 1 may correspond to each other. For example, with the head of the driver as a start point, a line segment that passes through the indicator may indicate the direction with respect to the vehicle 1. FIG. 3C illustrates an indicator 321 as an example of the indicator. The indicator 321 indicates an obliquely forward left side of the vehicle 1.

In the above examples, the direction with respect to the vehicle 1 is indicated by the position of the indicator. Instead of this, the direction with respect to the vehicle 1 may be indicated in another method. For example, in the method with respect to the vehicle 1, words such as "forward side" or "obliquely forward right side", may be indicated, or a symbol such as an arrow may be indicated.

In the above examples, the distance from the vehicle 1 is indicated by the position of the indicator. Instead of this, the distance from the vehicle 1 may be indicated in another method. For example, the distance from the vehicle 1 may be indicated by an Arabic numeral, or may be indicated by a distance between two points (for example, the distance between the leading end and the trailing end of an arrow).

A control method by the control device 2 related to the present disclosure will be described with reference to FIGS. 4A and 4B. This action may be started, when the power supply of the vehicle 1 is turned on, or may be started in response to the driver having instructed the start of the present action. Each step in the method of FIGS. 4A and 4B may be performed by the functional blocks of FIG. 2. For this reason, each step in the method of FIGS. 4A and 4B may be performed by a processor executing a program stored in a memory. Instead of this or in addition to this, at least a part of the steps in the method of FIGS. 4A and 4B may be performed on a dedicated circuit.

In step S401, the control device 2 (specifically, the environment recognition unit 201 and the line-of-sight detection unit 203) starts recognition of a surrounding environment of the vehicle 1 and detection of a line-of-sight direction of the driver. The recognition of the surrounding environment of the vehicle 1 and the detection of the line-of-sight direction of the driver are continuously performed throughout the method of FIGS. 4A and 4B. For example, the environment recognition unit 201 may recognize the surrounding environment of the vehicle 1 in a predetermined cycle (for example, a cycle of ten milliseconds to 100 milliseconds). The environment recognition unit 201 may store a recognition result in a storage device (for example, a memory in the ECU) for a predetermined period (for example, one minute) for subsequent processing. The line-of-sight detection unit 203 may detect the line of sight of the driver in a predetermined cycle (for example, a cycle of ten milliseconds). The line-of-sight detection unit 203 may store a detection result in a storage device (for example, a memory in the ECU) for a predetermined period (for example, one minute) for subsequent processing.

In step S402, the control device 2 (specifically, the risk identification unit 202) determines whether a risk is present in the surroundings of the vehicle 1. In a case where it is determined that the risk is present ("YES" in step S402), the control device 2 shifts the processing to step S403, and in the other case ("NO" in step S402), the control device 2 repeats step S402.

In step S403, the control device 2 (specifically, the risk identification unit 202) identifies a risk factor that may cause the risk identified in step S402, a direction of the risk factor with respect to the vehicle 1, and an urgency degree of the risk. The control device 2 (specifically, the risk identification unit 202) may identify a distance from the vehicle 1 to the risk factor, or may not necessarily identify the distance. The identification of the direction (and the distance depending on the case) of the risk factor and the identification of the urgency degree of the risk are continuously performed, until it is determined that the risk has been eliminated. For example, the risk identification unit 202 may identify the direction (and the distance depending on the case) of the risk factor and the urgency degree of the risk in a predetermined cycle (for example, a cycle of ten milliseconds).

In step S404, the control device 2 (specifically, the notification determination unit 207) determines whether the driver recognizes the risk factor identified in step S403. In a case where it is determined that the driver recognizes the risk factor ("YES" in step S404), the control device 2 shifts the processing to step S405, and in the other case ("NO" in step S404), the control device 2 shifts the processing to step S406.

The notification determination unit 207 may determine whether the driver recognizes the risk factor, based on the line-of-sight direction of the driver. For example, in a case where the line-of-sight direction of the driver is directed to the risk factor (for example, the risk factor is included within a predetermined range from the center of the line of sight) or in a case where the driver has been directed to the risk factor most recently (for example, within one minute), the notification determination unit 207, for example, may determine that the driver recognizes the risk factor. The notification determination unit 207 may determine whether the driver recognizes the risk factor, based on anything other than the line-of-sight direction of the driver. For example, the notification determination unit 207 may determine that the driver recognizes the risk factor in response to the driver having steered the vehicle 1 to move away from the risk factor.

In step S405, the control device 2 (specifically, the output control unit 208) displays risk information with a low emphasis degree on the display device 92, and in step S406, the control device 2 (specifically, the output control unit 208) displays the risk information with a high emphasis degree on the display device 92. In this manner, in the case where it is determined that the driver does not recognize the risk factor, the output control unit 208 displays the risk information with the high emphasis degree on the display device 92, whereas in the case where it is determined that the driver recognizes the risk factor, the output control unit 208 displays the risk information with the low emphasis degree on the display device 92. The low emphasis degree in step S405 means that the emphasis degree is lower than the emphasis degree in step S406.

The risk information denotes information about the risk factor identified in step S403. For example, the risk information includes the direction of the risk factor with respect to the vehicle 1. The risk information may further include the distance from the vehicle 1 to the risk factor. The risk information including the direction of the risk factor may be displayed with use of, for example, the indicators of FIGS. 3A to 3C. The risk information including the direction of the risk factor and the distance to the risk factor may be displayed with use of, for example, the indicator of FIG. 3B. Displaying the risk information is continued, until it is ended in a step to be described later. By displaying the risk information, attention of the driver can be attracted to the risk direction, and the driver easily recognizes the risk.

The actions in steps S404 to S406 described above are repeated, while the risk factor is present and the steering guide action is not performed. Therefore, while the risk factor is present and the steering guide action is not performed, the output control unit 208 keeps displaying the risk information. The driver does not recognize the risk factor at first. After the risk information is displayed with a high emphasis degree, when the driver notices (recognizes) the risk factor, the output control unit 208 performs step S405 to display the risk information with a low emphasis degree, that is, to lower the emphasis degree of the risk information.

In step S407, the control device 2 (specifically, the risk identification unit 202) determines whether the risk identified in step S402 has been eliminated. In a case where it is determined that the risk has been eliminated ("YES" in step S407), the control device 2 shifts the processing to step S414, and in the other case ("NO" in step S407), the control device 2 shifts the processing to step S408. The risk is eliminated by the behavior of the vehicle 1 (for example, a route change or a speed change) in some cases, or is eliminated by the behavior of the risk factor (for example, a route change or a speed change of another traffic participant) in some cases. The behavior of the vehicle 1 may be caused by an operation of the driver, or may be caused by an action of the braking control unit 205.

In a case where it is determined that the risk has been eliminated, the control device 2 (specifically, the output control unit 208) ends displaying the risk information on the display device 92 in step S414.

In step S408, the control device 2 (specifically, the notification determination unit 207) determines whether to take a steering guide action using the steering operation element, based on the urgency degree of the risk. In a case where it is determined that the steering guide action is to be taken ("YES" in step S408), the control device 2 shifts the processing to step S409, and in the other case ("NO" in step S408), the control device 2 shifts the processing to step S404. As described above, in a case where the urgency degree of the risk is high and it is necessary to steer the vehicle 1 to avoid the risk factor, the notification determination unit 207 may determine to take the steering guide action using the steering operation element.

In step S409, the control device 2 (specifically, the output control unit 208) displays avoidance information on the display device 92. The avoidance information denotes information indicating an advancing direction of the vehicle 1 in order to avoid the risk factor. For example, in a case where the risk factor is present on the left side of the vehicle 1, the avoidance information may indicate an obliquely forward right side of the vehicle 1. The avoidance information including the advancing direction of the vehicle 1 may be displayed with use of, for example, the indicators of FIGS. 3A to 3C. The output control unit 208 may display the avoidance information in a color different from the color used for displaying the risk information, or may display the avoidance information and the risk information in the same color. For example, the output control unit 208 may display the risk information in red and the avoidance information in blue. By displaying the avoidance information, the driver easily recognizes in which direction the vehicle 1 has to be steered, and the safety of the vehicle 1 is improved.

In step S410, the control device 2 (specifically, the output control unit 208) displays the risk information with a low emphasis degree on the display device 92, or ends displaying the risk information. The low emphasis degree in step S410 means that the emphasis degree is lower than the emphasis degree in step S406. At the time of emergency, the driver tends to rotate the steering operation element to the direction of the driver's own attention. By lowering the emphasis degree of the risk information or not displaying the risk information as in the present embodiment, the attention of the driver is easily attracted to the avoidance information. Therefore, the effectiveness of the steering guide action using the steering operation element is improved.

In step S411, the control device 2 (specifically, the steering guide unit 206) takes a steering guide action. The steering guide action may be taken only once until the risk is eliminated, or may be taken continuously or intermittently until the risk is eliminated.

Steps S409 to S411 may be performed in any sequence, or may be performed substantially simultaneously. The output control unit 208 may set the emphasis degree of the avoidance information displayed in step S409 to be higher than the emphasis degree of the risk information displayed in step S410. For example, the output control unit 208 may display the avoidance information in dark blue in step S409, and may display the risk information in light red in step S410.

In step S412, the control device 2 (specifically, the risk identification unit 202) determines whether the risk identified in step S402 has been eliminated. In a case where it is determined that the risk has been eliminated ("YES" in step S412), the control device 2 shifts the processing to step S413, and in the other case ("NO" in step S412), the control device 2 repeats step S412. The determination in step S412 may be similar to the determination in step S407.

In a case where it is determined that the risk has been eliminated, the control device 2 (specifically, the output control unit 208) ends displaying the avoidance information on the display device 92 in step S413. In a case where the risk information is displayed on the display device 92, the control device 2 (specifically, the output control unit 208) ends displaying the risk information. In a case where a steering guide action is continuously or intermittently taken, the control device 2 (specifically, the steering guide unit 206) ends the steering guide action.

In the above-described method, in a case where the driver recognizes the risk factor, the risk information is displayed with a low emphasis degree. Instead of this, the risk information may be displayed with the same emphasis degree (for example, an emphasis degree higher than the emphasis degree of the risk information in step S410) for the case where the driver recognizes the risk factor and the case where the driver does not recognize the risk factor. In this case, the detection of the line-of-sight direction in step S404 and steps S404 and S405 may be omitted.

In the above-described method, in a case where the driver recognizes the risk factor, the risk information is displayed with a low emphasis degree. Instead of this, the risk information may not necessarily be displayed, in the case where the driver recognizes the risk factor.

In the above-described method, the risk information is displayed in two levels of the emphasis degree. Instead of this, the risk information may be displayed in one level of the emphasis degree. In this case, the risk information may be displayed with the same emphasis degree for the case where the driver recognizes the risk factor and the case where the driver does not recognize the risk factor, and displaying the risk information may end in step S410. Instead of this, the risk information may be displayed, in the case where the driver does not recognize the risk factor, whereas the risk information may not necessarily be displayed, in the case where the driver recognizes the risk factor, and in the case where the steering guide action is taken.

Various specific examples of the control method of FIGS. 4A and 4B will be described with reference to FIGS. 5A to 9B. Hereinafter, a description will be given of a case where the vehicle 1 travels in a nation in which drivers keep to the left in accordance with traffic rules. The technology in the present disclosure may be applied to a case where the vehicle travels in a nation in which drivers keep to the right in accordance with traffic rules.

In a first example, the control device 2 uses the display device 92 of FIG. 3A to display the risk information in one level of the emphasis degree. The control device 2 does not identify the distance to the risk factor. Therefore, the risk information does not include the distance to the risk factor. The control device 2 displays the risk information and the avoidance information in different colors. The control device 2 displays the risk information, regardless of whether the driver recognizes the risk factor. The control device 2 does not display the risk information, in taking the steering guide action.

As illustrated in FIG. 5A, it is assumed that the vehicle 1 is traveling on a near side of an intersection. It is assumed that a pedestrian 500 is walking on a far side of the intersection, and a vehicle 501 is about to enter the intersection. The pedestrian 500 is walking straight, and thus the control device 2 does not identify the pedestrian 500 as a risk factor. On the other hand, the vehicle 501 is about to enter the intersection, and thus the control device 2 identifies the vehicle 501 as a risk factor. Therefore, the control device 2 displays an indicator 510 in red as the risk information in the display area 300. The indicator 510 indicates an obliquely forward left side of the vehicle 1. Then, as illustrated in FIG. 5B, when the vehicle 1 stops and the risk that the vehicle 1 comes into contact with the vehicle 501 is eliminated, the control device 2 ends displaying the indicator 510.

On the other hand, a case where the deceleration of the vehicle 1 is not in time and it is necessary to take a steering guide action in order to avoid the vehicle 501 will be described. In this case, the control device 2 takes the steering guide action so that the vehicle 1 moves along a route 503 (that is, so as to rotate the steering wheel 31 to the right and then rotate to the left). In addition, the control device 2 displays an indicator 511 in blue as avoidance information in the display area 300. The indicator 511 indicates a direction in which the vehicle 1 has to advance, that is, an obliquely forward right side. Furthermore, the control device 2 ends displaying the indicator 510. The control device 2 moves the position of the indicator 511 to the direction of an arrow 504 in accordance with a change in the direction in which the vehicle 1 has to advance, as the vehicle 1 moves along the route 503.

In a second example, the control device 2 uses the display device 92 of FIG. 3A to display the risk information in two levels of the emphasis degree. The control device 2 does not identify the distance to the risk factor. Therefore, the risk information does not include the distance to the risk factor. The control device 2 displays the risk information and the avoidance information in different colors. The control device 2 displays the risk information, regardless of whether the driver recognizes the risk factor. In taking the steering guide action, the control device 2 displays the risk information with a low emphasis degree.

Figures 5C, 5D:
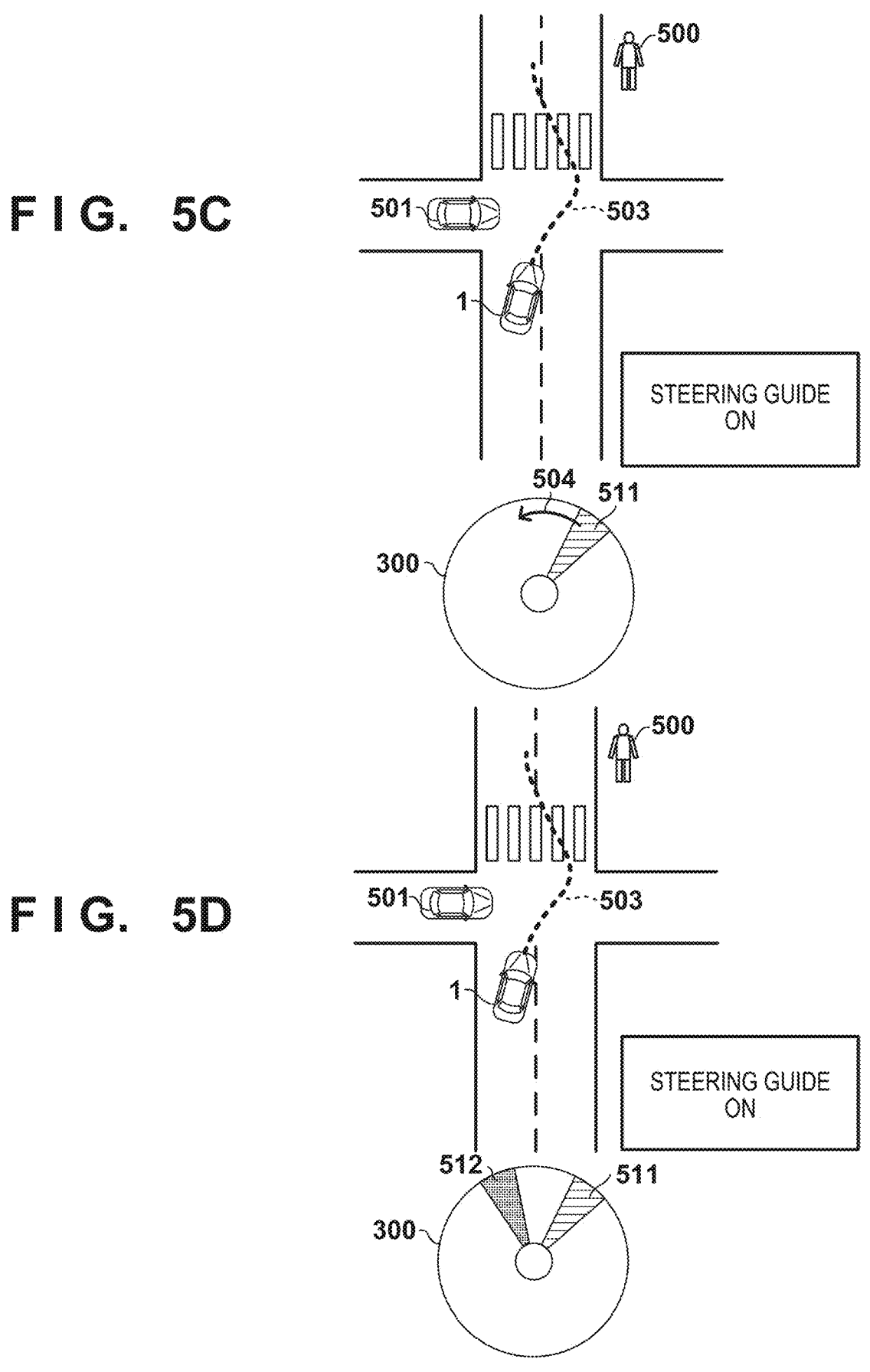

It is assumed that the situation of the vehicle 1 in the second example is similar to that in the first example. Differences between the first example and the second example will be described below. In FIG. 5A, the control device 2 displays the risk information by using the indicator 510 with a high emphasis degree (for example, dark red). As illustrated in FIG. 5D, in a case where the steering guide action has to be taken, the control device 2 displays the indicator 511 with a high emphasis degree (for example, dark blue), and displays an indicator 512 with a low emphasis degree (for example, light red). The indicator 511 indicates the avoidance information, and the indicator 512 indicates the risk information. The emphasis degree of the indicator 511 is higher than the emphasis degree of the indicator 512.

In a third example, the control device 2 uses the display device 92 of FIG. 3B to display the risk information in two levels of the emphasis degree. The control device 2 identifies the distance to the risk factor, and the risk information includes the distance to the risk factor. The control device 2 displays the risk information and the avoidance information in different colors. The control device 2 changes the emphasis degree of the risk information depending on whether the driver recognizes the risk factor. In taking the steering guide action, the control device 2 displays the risk information with a low emphasis degree.

Figures 6A, 6B:
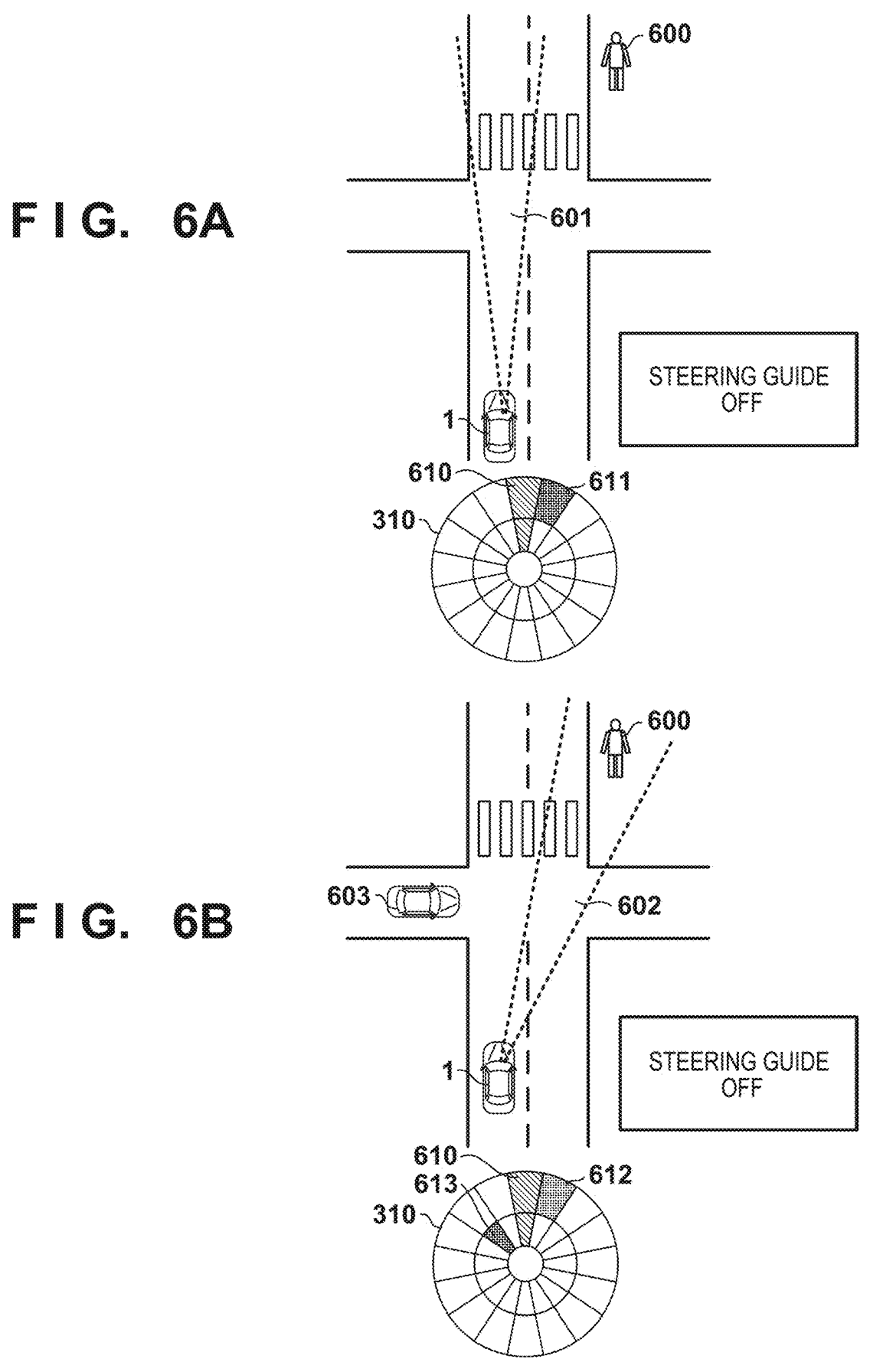

As illustrated in FIG. 6A, it is assumed that the vehicle 1 is traveling on a near side of an intersection. It is assumed that a pedestrian 600 is walking on a far side of the intersection. The pedestrian 600 is walking toward a crosswalk, and thus the control device 2 identifies the pedestrian 600 as a risk factor. The pedestrian 600 is out of a line-of-sight direction 601 of the driver. Therefore, the control device 2 displays an indicator 611 with a high emphasis degree (for example, dark red) as the risk information in the display area 310. The indicator 611 indicates a far position on an obliquely forward right side of the vehicle 1, where the pedestrian 600 is located. Furthermore, the control device 2 displays an indicator 610 indicating the current advancing direction of vehicle 1 with a low emphasis degree (for example, light blue). It is not necessary to attract the attention of the driver to the current advancing direction of the vehicle 1, and the control device 2 sets the indicator 610 to a low emphasis level. The indicator 610 does not have to indicate the information about the distance, and the indicator 610 uses two segments in the same fan shape in the display area 310.

Then, as illustrated in FIG. 6B, it is assumed that a line-of-sight direction 602 of the driver is directed to the pedestrian 600. Therefore, the control device 2 ends displaying the indicator 611, and displays an indicator 612 with a low emphasis level (for example, light red) as the risk information in the display area 310. In other words, the control device 2 lowers the emphasis degree of the risk information. The control device 2 is continuously displaying the indicator 610.

Figures 6C, 6D:
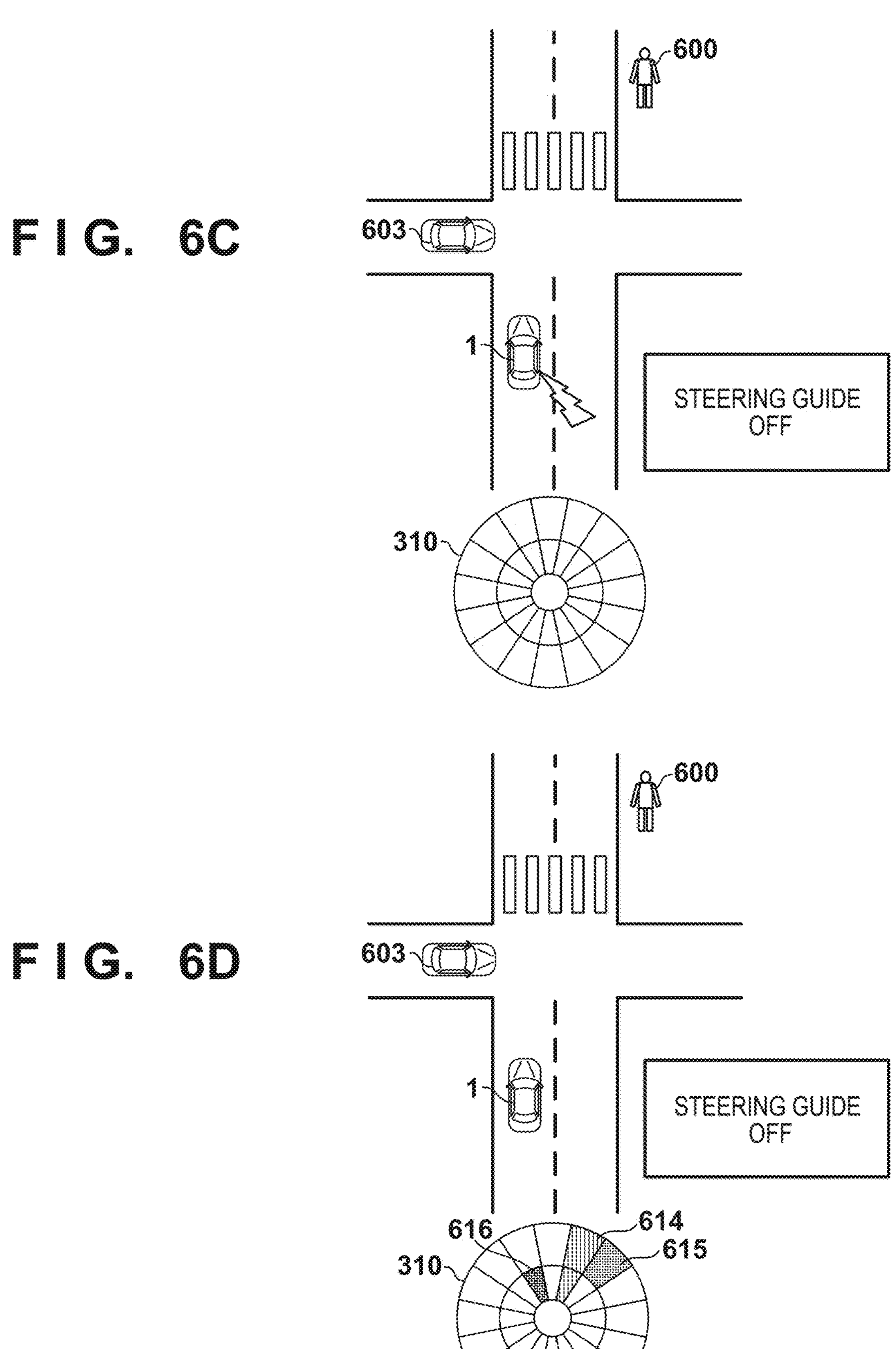
FIG. 6C is a schematic diagram for describing various examples of the control method according to an embodiment.
FIG. 6D is a schematic diagram for describing various examples of the control method according to an embodiment.

As illustrated in FIG. 6B, it is assumed that after the driver directs the line of sight toward the pedestrian 600, a vehicle 603 is about to enter the intersection. The control device 2 identifies the vehicle 603 as a risk factor. The vehicle 603 is not included in the line-of-sight direction 602 of the driver, and thus the control device 2 displays the indicator 613 with a high emphasis degree (for example, dark red) as the risk information in the display area 310. An indicator 613 indicates a close position on an obliquely forward left side of the vehicle 1, where the vehicle 603 is located. Then, as illustrated in FIG. 6C, when the vehicle 1 stops and the risks that the vehicle 1 comes into contact with the pedestrian 600 and the vehicle 603 are eliminated, the control device 2 ends displaying the indicators 612 and 613. In addition, the vehicle 1 is stopped, and thus the control device 2 also ends displaying the indicator 610 indicating the advancing direction of the vehicle 1.

On the other hand, in the state of FIG. 6D, when the driver does not recognize the vehicle 603, but the urgency degree of the risk is not high enough to take the steering guide action using the steering operation element, the control device 2 displays an indicator 614 in light blue, instead of the indicator 610. The indicator 614 indicates an advancing direction of the vehicle 1 in order to avoid the risk factor (the vehicle 603, in this example). The urgency degree is not high, and the steering guide action using the steering operation element is not taken. Therefore, the control device 2 sets the indicator 614 to a low emphasis degree.

Figures 7A, 7B:
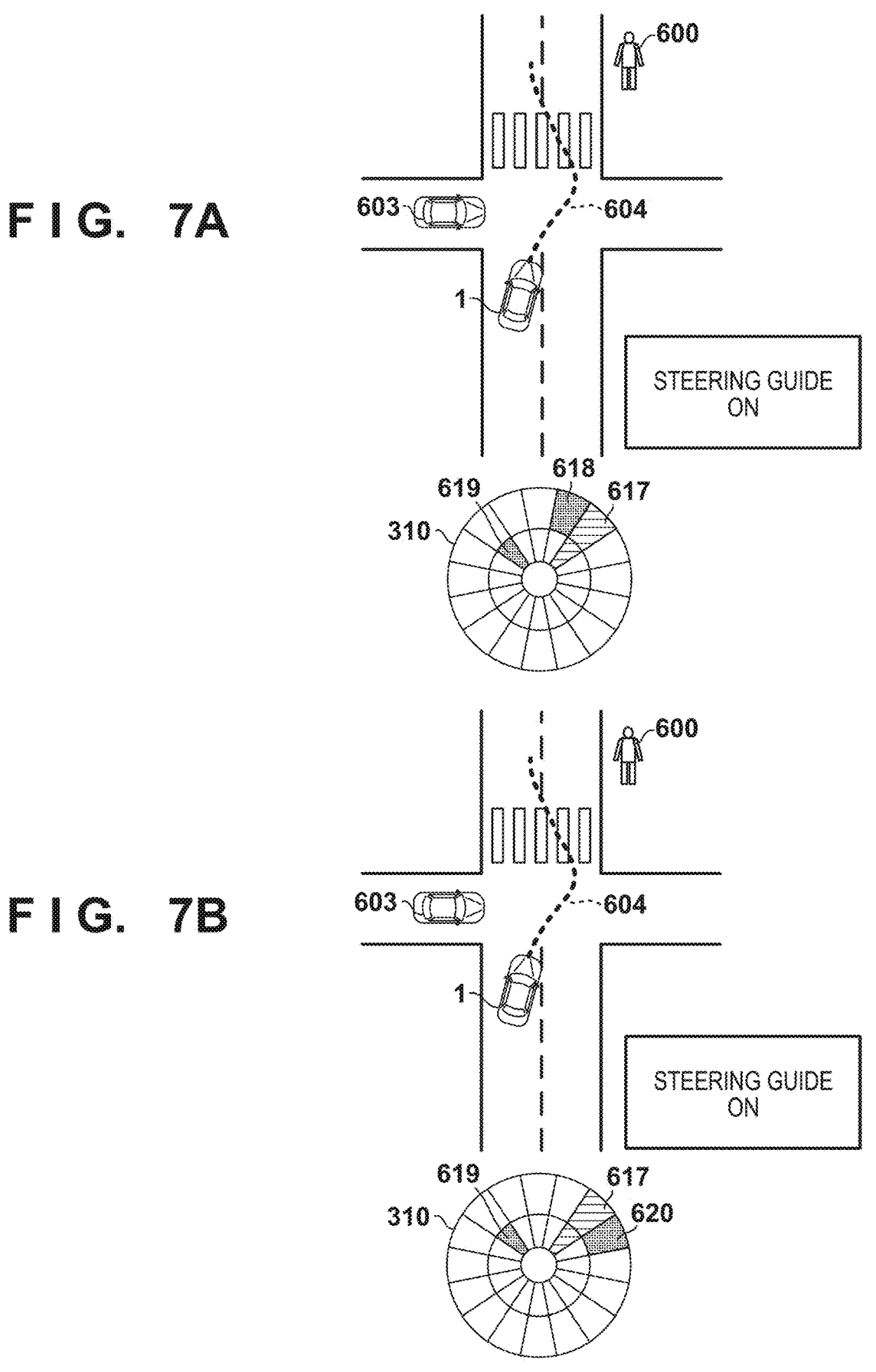

Then, when the vehicle 1 approaches the intersection, and the urgency degree of the risk becomes high, as illustrated in FIG. 7A, the control device 2 takes the steering guide action using the steering operation element so that the vehicle 1 moves along a route 604 (that is, so as to rotate the steering wheel 31 to the right and then rotate to the left). In this case, the control device 2 displays an indicator 617 in dark blue as the avoidance information in the display area 310. The indicator 617 indicates a direction in which the vehicle 1 has to advance, that is, an obliquely forward right side. The indicator 617 does not have to indicate the information about the distance, and the indicator 617 uses two segments in the same fan shape in the display area 310. Furthermore, the control device 2 ends displaying an indicator 616, and instead of this, displays an indicator 619 with a low emphasis level (for example, light red) as the risk information in the display area 310. The indicator 619 indicates a close position on an obliquely forward left side of the vehicle 1, where the vehicle 603 is located. In addition, the position where an indicator 615 has to be displayed overlaps the position where the indicator 617 has to be displayed. Therefore, the control device 2 prioritizes the indicator 617, shifts the position of the indicator 615, and indicates the risk information of the pedestrian 600 by using an indicator 618. The indicator 618 is displayed with a low emphasis degree (for example, light red). The control device 2 moves the position of the indicator 618 in accordance with a change in the direction in which the vehicle 1 has to advance, as the vehicle 1 moves along the route 604. As illustrated in FIG. 7B, the control device 2 may display an indicator 620 instead of the indicator 618. FIG. 7B is different from FIG. 7A in the direction to which the position of indicator 615 is shifted. Specifically, the control device 2 shifts the indicator 617 to a direction of moving away from the route 604 of the vehicle 1 in order to avoid the risk factor, and displays as the indicator 620. The indicator 620 is displayed with a low emphasis degree (for example, light red) similarly to the indicator 618. By displaying in this manner, after steering to the right in accordance with the indicator 617, the driver easily steers to the left to move away from the direction indicated by the indicator 620. As a result, the driver is easily guided to drive along the route 604.

Figures 8A, 8B:
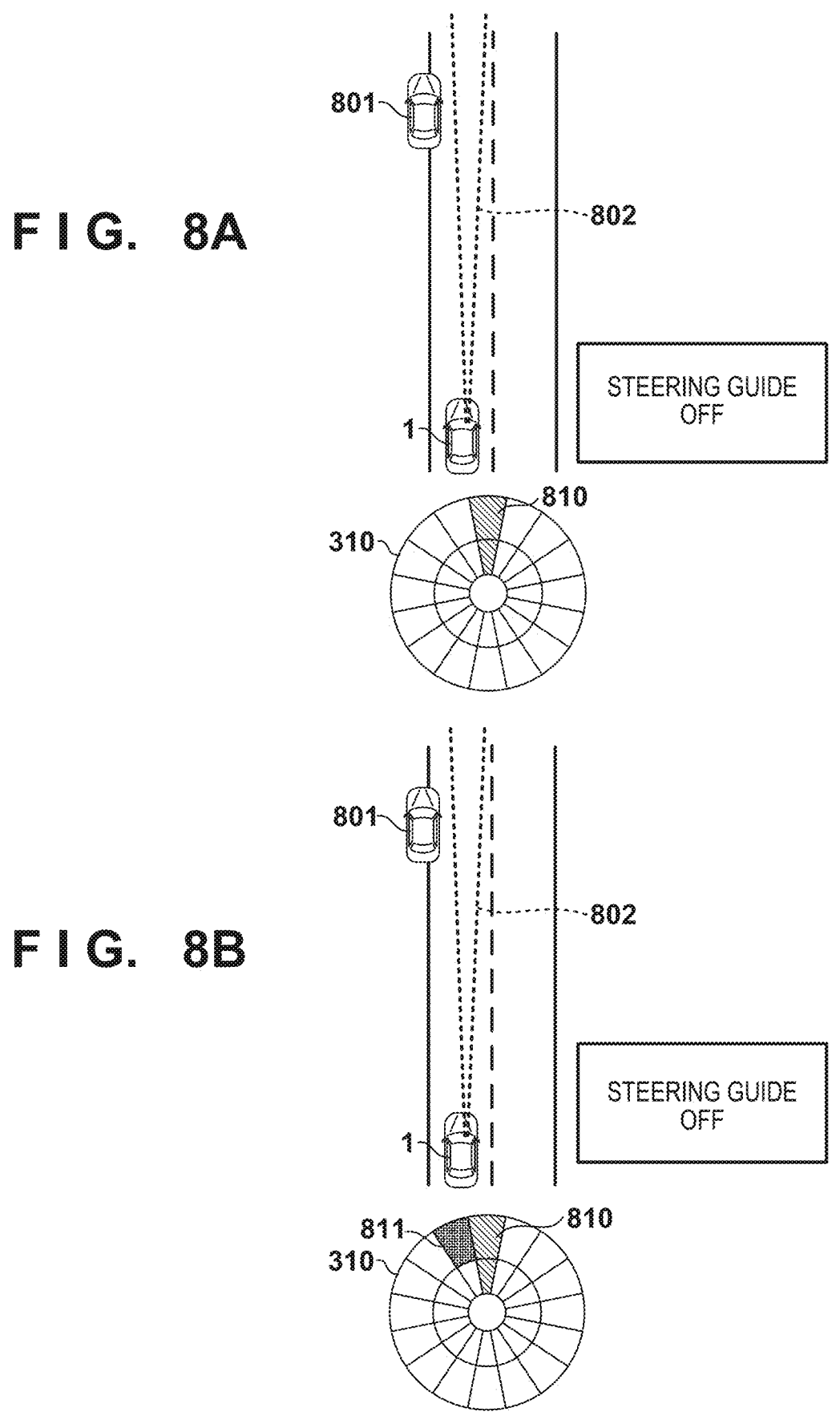

Next, the above-described third example will be described by using another situation. As illustrated in FIG. 8A, it is assumed that the vehicle 1 is traveling on a road. It is assumed that a vehicle 801 is stopped on a forward side of the vehicle 1. In this situation, it is assumed that the control device 2 does not recognize the vehicle 801. Therefore, the control device 2 displays only an indicator 810 indicating the advancing direction of the vehicle 1 with a low emphasis degree (for example, light blue) in the display area 310. A line-of-sight direction 802 of the driver is directed to a forward side.

As illustrated in FIG. 8B, it is assumed that the vehicle 1 approaches the vehicle 801 and the control device 2 recognizes the vehicle 801. The vehicle 801 protrudes onto the lane, and thus the control device 2 identifies the vehicle 801 as a risk factor. The vehicle 801 is out of the line-of-sight direction 802 of the driver. Therefore, the control device 2 displays an indicator 811 with a high emphasis degree (for example, dark red) as the risk information in the display area 310. The indicator 811 indicates a far position on an obliquely forward left side of the vehicle 1, where the vehicle 801 is located. The control device 2 is continuously displaying the indicator 810.

Figures 8C, 8D:
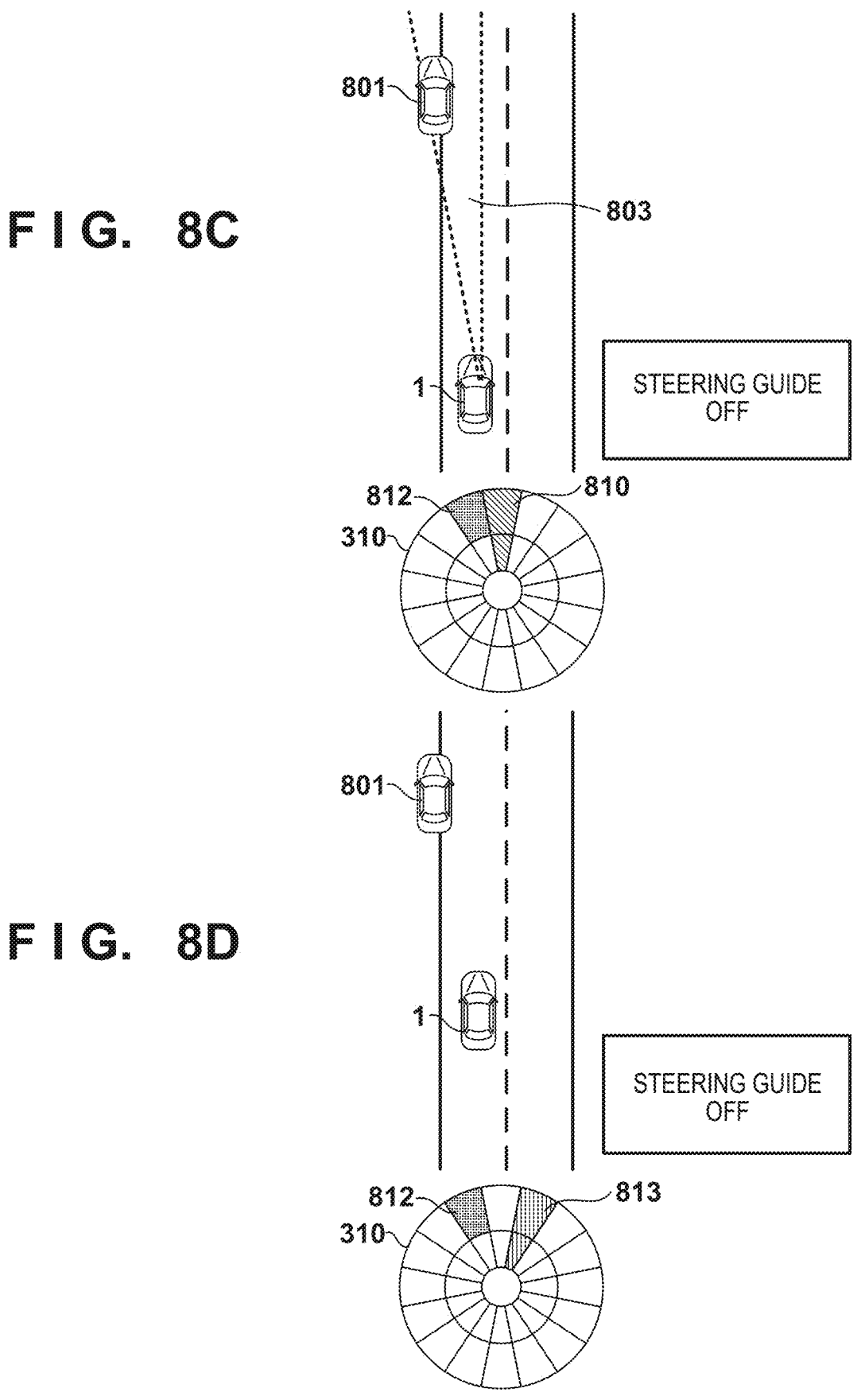

Then, as illustrated in FIG. 8C, it is assumed that a line-of-sight direction 803 of the driver is directed to the vehicle 801. Therefore, the control device 2 ends displaying the indicator 811, and displays an indicator 812 with a low emphasis level (for example, light red) as the risk information in the display area 310. In other words, the control device 2 lowers the emphasis degree of the risk information. The control device 2 is continuously displaying the indicator 810.

As illustrated in FIG. 8D, in a case where the distance to the vehicle 801 is long and the urgency degree of the risk is not high enough to take the steering guide action using the steering operation element, the control device 2 displays an indicator 813 in light blue, instead of the indicator 810. The indicator 813 indicates an advancing direction of the vehicle 1 in order to avoid a risk factor (the vehicle 801, in this example). The urgency degree is not high, and the steering guide action using the steering operation element is not taken. Therefore, the control device 2 sets the indicator 813 to a low emphasis degree.

Then, when the vehicle 1 approaches the vehicle 801 while traveling straight, and the urgency degree of the risk becomes high, as illustrated in FIG. 9A, the control device 2 takes the steering guide action using the steering operation element so that the vehicle 1 moves to the right side of the lane (that is, so as to rotate the steering wheel 31 to the right). In this case, the control device 2 displays an indicator 814 in dark blue as the avoidance information in the display area 310. The indicator 814 indicates a direction in which the vehicle 1 has to advance, that is, an obliquely forward right side. The indicator 814 does not have to indicate the information about the distance, and the indicator 814 uses two segments in the same fan shape in the display area 310. The control device 2 is continuously displaying the indicator 812 with a low emphasis degree.

After the vehicle 1 moves to the right side of the lane, as illustrated in FIG. 9B, the control device 2 takes the steering guide action using steering operation element so that the vehicle 1 travels straight (that is, so that the driver does not rotate the steering wheel 31). In this case, the control device 2 displays an indicator 815 in dark blue as the avoidance information in the display area 310, instead of the indicator 814.

Next, other embodiments will be described. In general, among human senses, the visual sense can receive the largest amount of information. For this reason, it is effective to notify the driver that there is a risk in the surroundings of the vehicle by using a display device. However, unless the driver looks at the information displayed on the display device, such information cannot let the driver know the presence of the risk. According to embodiments in the following, it becomes possible to let the driver know the presence of the risk appropriately.

In the following embodiments, the risk identification unit 202 identifies that a risk factor is present in the surroundings of the vehicle 1, based on the environment in the surroundings of the vehicle 1 that has been recognized by the environment recognition unit 201 and the current behavior (for example, the speed, the acceleration, the advancing direction, or the like of the vehicle 1) of the vehicle 1. The risk identification unit 202 may further identify the direction of the risk factor with respect to the vehicle 1 and the distance from the vehicle 1 to the risk factor. The risk factor denotes a factor that gives a risk to the vehicle 1 with a possibility equal to or larger than a threshold. The risk to be received by the vehicle 1 may include the vehicle 1 contacting an object present in the surroundings of the vehicle 1. In a case where the possibility that the vehicle 1 comes into contact with an object present in the surroundings of the vehicle 1 is equal to or larger than the threshold (for example, equal to or larger than 30%), the risk identification unit 202 may identify such an object as a risk factor. The vehicle 1 contacting the object may include a collision of the vehicle 1 with the object. Furthermore, the risk to be received by the vehicle 1 may be a risk other than contact, for example, the vehicle 1 entering a travel prohibited area or the vehicle 1 deviating from a travel passage. In this example, such a travel prohibited area is the risk factor.

In the following embodiments, the notification determination unit 207 determines whether to notify the driver of information, and determines its content and a notification mode, in notifying the driver of the information. For example, in a case where a risk factor is present in the surroundings of the vehicle 1, the notification determination unit 207 may determine to notify the driver that the risk factor is present. In addition, the notification determination unit 207 may determine to notify the driver of the direction of the risk factor with respect to the vehicle 1, the distance from the vehicle 1 to the risk factor, or both of them. Details of the information notified to the driver will be described later.

In the following embodiments, the output control unit 208 controls the actions of devices for notifying the driver of information, specifically, the sound output device 91 and the display device 92, which have been described above. For example, the output control unit 208 outputs information that has been determined to be notified by the notification determination unit 207 to the driver via the sound output device 91 and/or the display device 92. In a case where the steering operation element of the vehicle 1, for example, the steering wheel 31 has a notification function, the output control unit 208 may control the action of the steering wheel 31 to notify the driver of information. For example, in a case where the steering wheel 31 is capable of vibrating, the output control unit 208 may notify the information by vibrating the steering wheel 31.

In the following embodiments, the display device 92 is capable of displaying information indicating that a specific event has occurred. In addition, the display device 92 may be capable of displaying information indicating a direction with respect to the vehicle 1. In FIG. 3A, an indicator may be displayed in the display area 300 to indicate that the specific event has occurred (for example, the risk factor is present in the surroundings of the vehicle 1).

A control method by the control device 2 related to the present disclosure will be described with reference to FIG. 10. This action may be started, when the power supply of the vehicle 1 is turned on, or may be started in response to the driver having instructed the start of the present action. Each step in the method of FIG. 10 may be performed by the functional blocks in FIG. 2. For this reason, each step in the method of FIG. 10 may be performed by a processor executing a program stored in a memory. Instead of this or in addition to this, at least a part of the steps in the method of FIG. 10 may be performed on a dedicated circuit.

In step S1001, the control device 2 (specifically, the environment recognition unit 201 and the line-of-sight detection unit 203) starts recognition of the surrounding environment of the vehicle 1 and detection of the line-of-sight direction of the driver. The recognition of the surrounding environment of the vehicle 1 and the detection of the line-of-sight direction of the driver are continuously performed throughout the method of FIG. 10. For example, the environment recognition unit 201 may recognize the surrounding environment of the vehicle 1 in a predetermined cycle (for example, a cycle of ten milliseconds to 100 milliseconds). The environment recognition unit 201 may store a recognition result in a storage device (for example, a memory in the ECU) for a predetermined period (for example, one minute) for subsequent processing. The line-of-sight detection unit 203 may detect the line of sight of the driver in a predetermined cycle (for example, a cycle of ten milliseconds). The line-of-sight detection unit 203 may store a detection result in a storage device (for example, a memory in the ECU) for a predetermined period (for example, one minute) for subsequent processing.

In step S1002, the control device 2 (specifically, the risk identification unit 202) determines whether a risk is present in the surroundings of the vehicle 1. In a case where it is determined that the risk is present ("YES" in step S1002), the control device 2 shifts the processing to step S1003, and in the other case ("NO" in step S1002), the control device 2 repeats step S1002.

In step S1003, the control device 2 (specifically, the risk identification unit 202) identifies a risk factor that may cause the risk identified in step S1002. The control device 2 (specifically, the risk identification unit 202) may identify the direction of the risk factor with respect to the vehicle 1 and the distance from the vehicle 1 to the risk factor, or may not necessarily identify them. The direction and the distance to the risk factor are continuously identified, until it is determined that the risk has been eliminated. For example, the risk identification unit 202 may identify the direction and the distance to the risk factor in a predetermined cycle (for example, a cycle of ten milliseconds).

In step S1004, the control device 2 (specifically, the notification determination unit 207) determines whether the driver recognizes the risk factor identified in step S1003. In a case where it is determined that the driver recognizes the risk factor ("YES" in step S1004), the control device 2 shifts the processing to step S1010, and in the other case ("NO" in step S1004), the control device 2 shifts the processing to step S1005.

The notification determination unit 207 may determine whether the driver recognizes the risk factor, based on the line-of-sight direction of the driver. For example, in a case where the line-of-sight direction of the driver is directed to the risk factor (for example, the risk factor is included within a predetermined range from the center of the line of sight) or in a case where the driver has been directed to the risk factor most recently (for example, within one minute), the notification determination unit 207 may determine that the driver recognizes the risk factor. The range of the line of sight of the driver used for determining whether the driver recognizes the risk factor may be a range considered to be gazed by the driver (hereinafter, referred to as a gaze range). The gaze range of the driver may be a predetermined range from the center of the line of sight of the driver (for example, within 15 degrees from the center). The gaze range of the driver may be a range narrower than the visual field of the driver.

The notification determination unit 207 may determine whether the driver recognizes the risk factor, based on anything other than the line-of-sight direction of the driver. For example, the notification determination unit 207 may determine that the driver recognizes the risk factor in response to the driver having steered the vehicle 1 to move away from the risk factor.

In step S1005, the control device 2 (specifically, the notification determination unit 207) determines whether the driver is able to visually recognize a display position of the risk information. In a case where it is determined that the driver is able to visually recognize the display position of the risk information ("YES" in step S1005), the control device 2 shifts the processing to step S1007, and in the other case ("NO" in step S1005), the control device 2 shifts the processing to step S1006.

The risk information denotes information about the risk factor identified in step S1003. For example, the risk information indicates that the risk factor is present in the surroundings of the vehicle 1. The risk information may further include the direction of the risk factor with respect to the vehicle 1, the distance from the vehicle 1 to the risk factor, or both of them. The presence of the risk factor in the surroundings of the vehicle 1 may be indicated, for example, by displaying the indicators of FIGS. 3A to 3C. The direction of the risk factor may be displayed by using, for example, the indicators of FIGS. 3A to 3C. The distance to the risk factor may be displayed by using, for example, the indicators of FIG. 3B. Displaying the risk information is continued, until it is ended in a step to be described later. By displaying the risk information, attention of the driver can be attracted to the risk direction, and the driver easily recognizes the risk.

The display position of the risk information denotes a position in which the risk information is displayed on the display device 92. For example, in the example of FIG. 3A, the display area 300 is the display position of the risk information. In the example of FIG. 3B, the display area 310 is the display position of the risk information. In the example of FIG. 3C, the LED line 320 is the display position of the risk information.

The notification determination unit 207 may determine whether the driver is able to visually recognize the display position of the risk information, based on the line-of-sight direction of the driver. For example, the notification determination unit 207 may estimate the visual field of the driver, and may determine whether the driver is able to visually recognize the display position of the risk information, based on whether the display position of the risk information is included in the estimated visual field of the driver. The visual field of the driver may be estimated to be included within a predetermined range from the center of the line of sight of the driver (for example, within 80 degrees from the center).

The notification determination unit 207 may determine whether the driver is able to visually recognize the display position of the risk information, based on anything other than the visual field of the driver. For example, when the driver closes the eyes, the notification determination unit 207 may determine that the driver is not able to visually recognize the display position of the risk information.

In step S1006, the control device 2 (specifically, the output control unit 208) notifies the driver of the presence of the risk factor in the surroundings of the vehicle 1 in a mode different from displaying the risk information in the display position of the risk information. Hereinafter, a notification in a mode different from displaying the risk information in the display position of the risk information will be referred to as a supplementary notification.

The supplementary notification may be given in a manner recognizable by a sense other than the visual sense. For example, the supplementary notification may be given in an audibly recognizable manner. For example, the output control unit 208 may output audible information indicating that a risk factor is present in the surroundings of the vehicle 1. For example, the audible information may be a warning sound of a predetermined tone (for example, "beep" sound or the like), or may be sounds for giving a message (for example, sound of voices such as "pay attention to the surroundings of the vehicle").

Furthermore, the supplementary notification with the audible information may indicate the direction of the risk factor. For example, in a case where the sound output device 91 of the vehicle 1 includes a plurality of speakers, the output control unit 208 may indicate the direction of the risk factor by adjusting the volume of the audible information in each speaker. For example, in a case where the vehicle 1 includes speakers on an obliquely front right side and an obliquely front left side in the vehicle interior, the output control unit 208 may output the audible information only from the speaker on the obliquely front right side to indicate that the risk factor is present on the right side, may output the audible information only from the speaker on the obliquely front left side to indicate that the risk factor is present on the left side, and may output the audible information only from the speakers on both sides to indicate that the risk factor is present in the advancing direction. Instead of this or in addition to this, the output control unit 208 may indicate the direction of the risk factor by adjusting the sound quality of the audible information. For example, the output control unit 208 may indicate that a risk factor is present on a forward side of the vehicle 1 by using the audible information of high-pitched sounds, or may indicate that the risk factor is present on the forward side of the vehicle 1 by using audible information of low-pitched sounds. Instead of this or in addition to this, the output control unit 208 may indicate that the risk factor is present on a forward side of the vehicle 1 by using the audible information of harmonic sound of an integer order, or may indicate that the risk factor is present on a forward side of the vehicle 1 by using the audible information of harmonic sound of a non-integer order. By indicating the risk direction with a difference in sound quality in this manner, it becomes possible to indicate the direction of the risk factor on a forward, rearward, leftward, or rightward side, even in a case where the vehicle 1 includes only two pairs of speakers on the left and right. Instead of this or in addition to this, the output control unit 208 may indicate the direction of the risk factor by using contents of a message (for example, "pay attention to an obliquely forward left side of the vehicle").

The supplementary notification may be given in a tactilely recognizable manner. For example, the output control unit 208 may indicate that a risk factor is present in the surroundings, by vibrating a steering operation element (for example, the steering wheel 31) of the vehicle 1. Such vibration may be applied intermittently or continuously. The supplementary notification with vibration may indicate the direction of the risk factor. For example, the output control unit 208 may indicate that the risk factor is present on the right side by vibrating only the right side of the steering operation element, may indicate that the risk factor is present on the left side by vibrating only the left side of the steering operation element, and may indicate that the risk factor is present in the advancing direction by vibrating both sides of the steering operation element.

The supplementary notification may be given with use of the visual sense. For example, the vehicle 1 may include a supplementary display device such as an LED on a lateral side of the vehicle interior, and the control device 2 may give the supplementary notification by turning on or blinking such a supplementary display device. Also while the driver is looking at a lateral side of the vehicle 1 and is not able to visually recognize the display device on the front side of the vehicle interior, the driver is able to visually recognize the display device on the lateral side of the vehicle interior in some cases, so that the supplementary notification can be appropriately given.

By giving the supplementary notification as described above, even when the driver is not able to visually recognize the display position of the risk information, it becomes possible to notify the driver that the risk factor is present in the surroundings of the vehicle 1. In addition, when the driver is able to visually recognize the display position of the risk information, the supplementary notification is not given, so that excessive information notified to the driver can be suppressed. The supplementary actions in the above-described various modes may be taken in combination.

In step S1007, the control device 2 (specifically, the output control unit 208) does not give the supplementary notification. In a case where step S1006 has been performed by the action until the current step and the supplementary notification has been given, the output control unit 208 ends the supplementary notification. Unless the supplementary notification is given, the output control unit 208 does not perform the processing in step S1007.

In step S1008, the control device 2 (specifically, the output control unit 208) displays the risk information on the display device 92.

In step S1009, the control device 2 (specifically, the risk identification unit 202) determines whether the risk identified in step S1002 has been eliminated. In a case where it is determined that the risk has been eliminated ("YES" in step S1009), the control device 2 shifts the processing to step S1010, and in the other case ("NO" in step S1009), the control device 2 shifts the processing to step S1004. The risk is eliminated by the behavior of the vehicle 1 (for example, a route change or a speed change) in some cases, or is eliminated by the behavior of the risk factor (for example, a route change or a speed change of another traffic participant) in some cases.

In a case where it is determined that the risk has been eliminated or in a case where the driver recognizes the risk factor, the control device 2 (specifically, the output control unit 208) ends displaying the risk information, if the risk information is displayed, and ends the supplementary notification, if the supplementary notification is given, in step S1010.

According to the above method, the control device 2 does not display the risk information, in the case where the driver recognizes the risk factor. Instead of this, the control device 2 may display the risk information, also in the case where the driver recognizes the risk factor. In this case, in the case where the driver recognizes the risk factor, the control device 2 may display the risk information with an emphasis degree lower than that in the case where the driver does not recognize the risk factor.

In the above-described method, after giving the supplementary notification, the control device 2 displays the risk information on a display device 82. Accordingly, after the supplementary notification enables the driver to visually recognize the display position of the risk information, the possibility of displaying the risk information is increased. Accordingly, the driver easily recognizes that the risk information has been newly displayed. The control device 2 may give a supplementary notification so that the driver further easily recognizes that the risk information has been newly displayed. After it is determined that the supplementary notification enables the driver to visually recognize the display position of the risk information, the risk information may be displayed on the display device 82. Instead of this, the display of the risk information on the display device 82 and the supplementary notification may be performed substantially simultaneously, or the display of the risk information on the display device 82 may be performed earlier than the supplementary notification.

Examples in which the control method of FIG. 10 is applied to various situations will be described with reference to FIGS. 11A to 12C. Hereinafter, a description will be given of a case where the vehicle 1 travels in a nation in which drivers keep to the left in accordance with traffic rules. The technology in the present disclosure may be applied to a case where the vehicle travels in a nation in which drivers keep to the right in accordance with traffic rules.

Figures 11A, 11B, 11C:
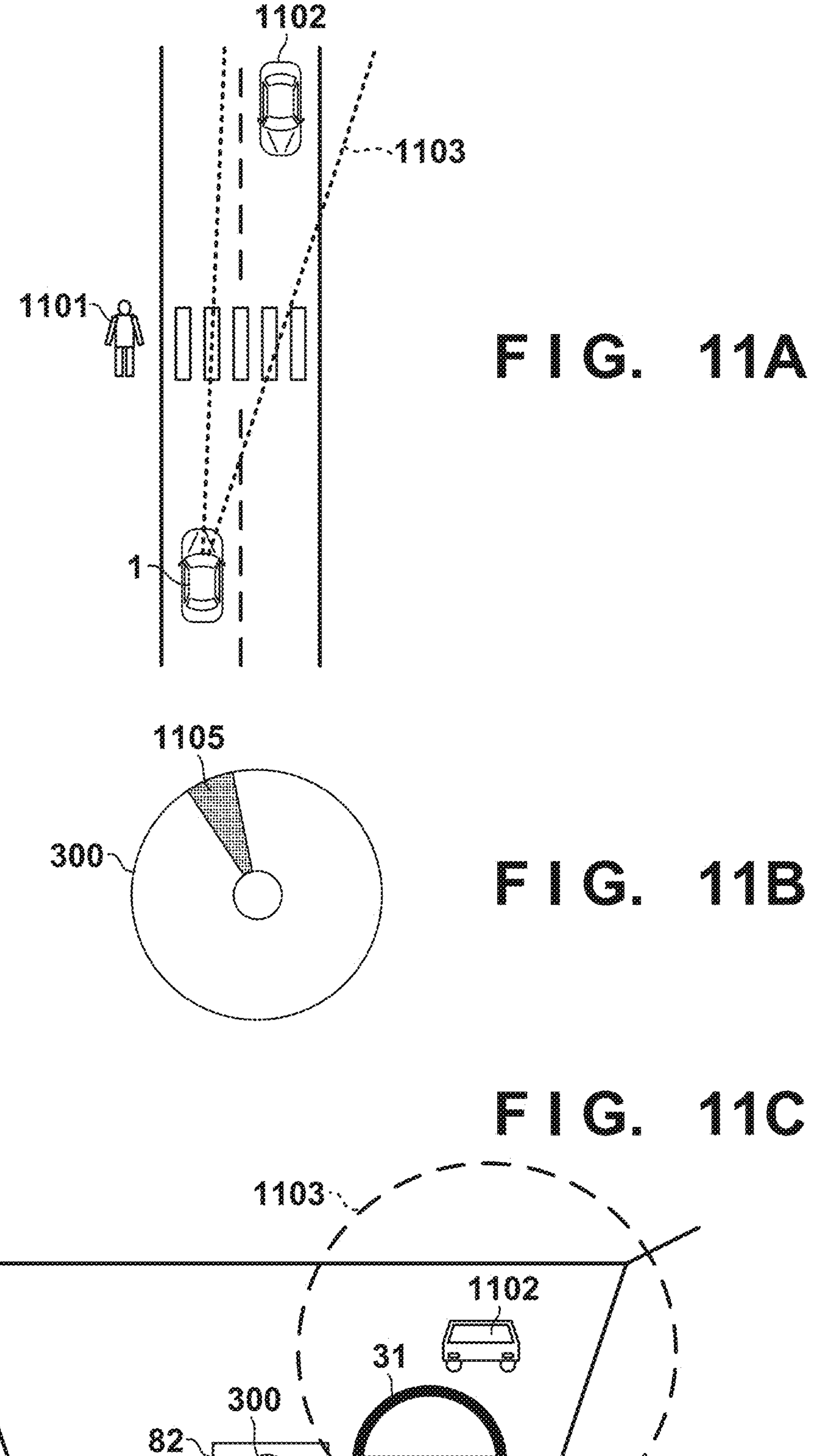
FIG. 11A is a schematic diagram for describing various examples of the control method according to an embodiment.
FIG. 11B is a schematic diagram for describing various examples of the control method according to an embodiment.
FIG. 11C is a schematic diagram for describing various examples of the control method according to an embodiment.

As illustrated in FIG. 11A, it is assumed that vehicle 1 is traveling on a near side of a crosswalk. It is assumed that a pedestrian 1101 is walking toward the crosswalk, and a vehicle 1102 is traveling in an opposite lane on a far side of the crosswalk. FIG. 11C illustrates a situation in the vehicle interior of the vehicle 1. The display device 82 of the vehicle 1 is installed in the center on the front side of the vehicle interior. In addition, a speaker 91L is installed on an obliquely front left side in the vehicle interior, and a speaker 91R is installed on an obliquely front right side of the vehicle interior.

It is assumed that the driver faces the direction of the vehicle 1102. The control device 2 estimates a predetermined range with the direction of the vehicle 1102 as the center, as a gaze range 1103 of the driver, based on the line-of-sight direction of the driver, and estimates the predetermined range with the direction of the vehicle 1102 as the center, as a visual field 1104 of the driver. The visual field 1104 is wider than the gaze range 1103.

The pedestrian 1101 is walking toward the crosswalk, and thus the control device 2 identifies the pedestrian 1101 as a risk factor. The pedestrian 1101 is not included in the gaze range 1103 of the driver, and thus the control device 2 determines that the driver does not recognize the pedestrian 1101. Therefore, as illustrated in FIG. 11B, the control device 2 displays an indicator 1105 in the display area 300 of the display device 82. The indicator 1105 indicates the presence of the risk factor (the pedestrian 1101, in this example), and also indicates the direction of the risk factor with respect to the vehicle 1. The display position of the indicator 1105 is included in the visual field 1104 of the driver, and thus the control device 2 does not give a supplementary notification.

Figure 12A:
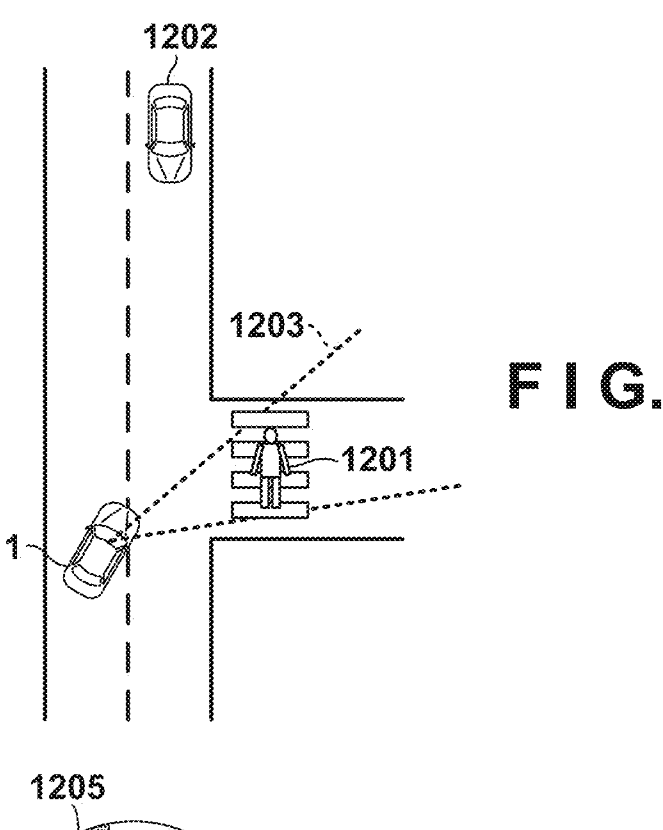
FIG. 12A is a schematic diagram for describing various examples of the control method according to an embodiment.
Figure 12B:
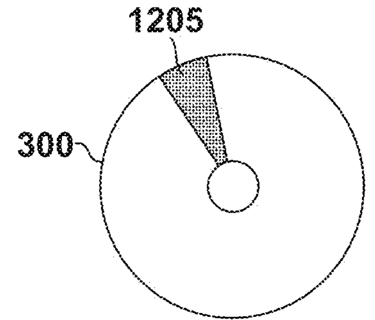
FIG. 12B is a schematic diagram for describing various examples of the control method according to an embodiment.
Figure 12C:
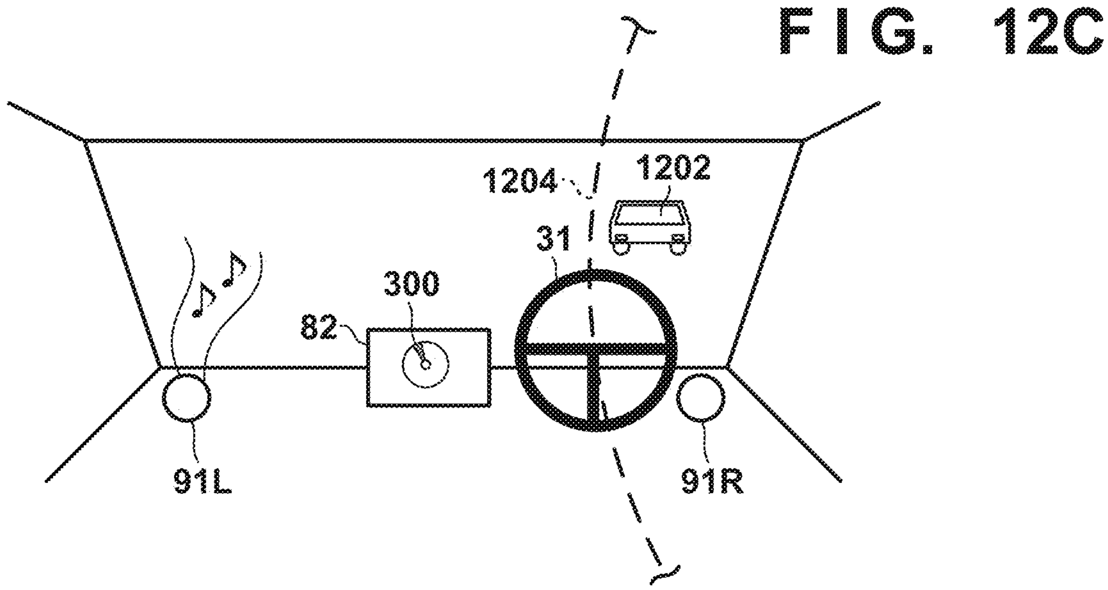
FIG. 12C is a schematic diagram for describing various examples of the control method according to an embodiment.

An example in which the control method in FIG. 10 is applied to another situation will be described with reference to FIGS. 12A to 12C. As illustrated in FIG. 12A, it is assumed that the vehicle 1 is about to turn to the right on a T-junction. It is assumed that a pedestrian 1201 is walking on a crosswalk, and a vehicle 1202 is traveling in an opposite lane. FIG. 12C illustrates a situation in the vehicle interior of the vehicle 1. The display device 82 of the vehicle 1 is installed in the center on the front side of the vehicle interior. In addition, a speaker 91L is installed on an obliquely front left side in the vehicle interior, and a speaker 91R is installed on an obliquely front right side of the vehicle interior.

It is assumed that the driver faces the direction of the pedestrian 1201. The control device 2 estimates a predetermined range with the direction of the pedestrian 1201 as the center, as a gaze range 1203 of the driver, based on the line-of-sight direction of the driver, and estimates a predetermined range with the direction of the pedestrian 1201 as the center, as a visual field 1204 of the driver. The visual field 1204 is wider than the gaze range 1203.

The vehicle 1202 is approaching the vehicle 1, and thus the control device 2 identifies the vehicle 1202 as a risk factor. The vehicle 1202 is not included in the gaze range 1203 of the driver, and thus the control device 2 determines that the driver does not recognize the vehicle 1202. Therefore, as illustrated in FIG. 12B, the control device 2 displays an indicator 1205 in the display area 300 of the display device 82. The indicator 1205 indicates the presence of the risk factor (the vehicle 1202, in this example), and also indicates the direction of the risk factor with respect to the vehicle 1.

The display position of the indicator 1205 is not included in the visual field 1204 of the driver, and thus the control device 2 gives a supplementary notification. Specifically, the risk factor is present on an obliquely forward left side of the vehicle 1. Therefore, the control device 2 outputs the audible information (for example, the warning sound) from the speaker 91L, but does not output the audible information (for example, the warning sound) from the speaker 91R. Even though the driver is not able to visually recognize the indicator 1205, the driver is able to learn that the risk factor is present in the surroundings of the vehicle 1, and is able to further learn the direction of the risk factor from the audible information.

Summary of Embodiments

<Item 1> A control device (2) for controlling a vehicle (1) including a display device (92) and a steering operation element (31), the control device comprising:

a risk identification unit (202) configured to identify a risk factor (501, 600, 603, 801) present in surroundings of the vehicle and a direction of the risk factor with respect to the vehicle;

a display control unit (208) configured to display, on the display device, risk information indicating the direction of the risk factor with a first emphasis degree; and a guidance control unit (206) configured to take a guidance action using the steering operation element, the guidance action guiding a driver of the vehicle to operate the steering operation element to avoid the risk factor, wherein when the guidance control unit takes the guidance action using the steering operation element, the display control unit displays, on the display device, avoidance information indicating an advancing direction of the vehicle to avoid the risk factor, and the display control unit displays the risk information with a second emphasis degree lower than the first emphasis degree, or does not display the risk information.

According to this item, the attention of the driver can be attracted to the avoidance information, so that the steering by the driver can be guided to avoid the risk.

<Item 2> The control device according to Item 1, wherein when the guidance control unit takes the guidance action using the steering operation element, the display control unit displays the risk information with the second emphasis degree lower than the first emphasis degree.

According to this item, the driver becomes able to easily recognize the direction to be steered, and is also able to grasp the location of the risk factor.

<Item 3> The control device according to Item 2, wherein the display control unit displays the avoidance information with a third emphasis degree higher than the second emphasis degree.

According to this item, the driver more easily recognizes the direction to be steered.

<Item 4> The control device according to Item 2 or 3, wherein in a case where a display position of the avoidance information overlaps a display position of the risk information, the display control unit shifts the display position of the risk information to a direction of moving away from a route of the vehicle for avoiding the risk factor.

According to this item, it becomes easy to guide the driver to drive along the route to be taken.

<Item 5> The control device according to Item 1, wherein when the guidance control unit takes the guidance action using the steering operation element, the display control unit does not display the risk information.

According to this item, the driver more easily recognizes the direction to be steered.

<Item 6> The control device according to any one of Items 1-5, further comprising:

a line-of-sight detection unit (203) configured to detect a line-of-sight direction of the driver; and a recognition determination unit (207) configured to determine whether the driver recognizes the risk factor, based on the line-of-sight direction, wherein in a case where the risk factor is present and the guidance control unit does not take the guidance action using the steering operation element, when it is determined that the driver does not recognizes the risk factor, the display control unit displays, on the display device, the risk information with the first emphasis degree, and when it is determined that the driver recognizes the risk factor, the display control unit displays, on the display device, the risk information with a fourth emphasis degree lower than the first emphasis degree.

According to this item, it becomes easy to grasp the risk that the driver does not recognize.

<Item 7> The control device according to any one of Items 1-6, wherein the risk identification unit further identifies a distance to the risk factor, and the risk information further indicates the distance to the risk factor.

According to this item, the driver easily recognizes the distance to the risk factor.

<Item 8> The control device according to any one of Items 1-7, wherein in a case where a possibility that the vehicle comes into contact with an object present in the surroundings of the vehicle is equal to or larger than a threshold, the risk identification unit identifies the object as the risk factor.

According to this item, it becomes easy to suppress contact between the vehicle and the object.

<Item 9> The control device according to any one of Items 1-8, wherein in a case where the risk factor is present and while the guidance control unit does not take the guidance action using the steering operation element, the display control unit keeps displaying the risk information.

According to this item, the driver easily finds the risk factor before the guidance action is taken.

<Item 10> The control device according to any one of Items 1-9, wherein the risk factor includes a traffic participant present in the surroundings of the vehicle.

According to this item, the risk regarding the traffic participant can be reduced.

<Item 11> The control device according to any one of Items 1-10, wherein the guidance action includes at least one of changing torque for the driver to rotate the steering operation element, vibrating a specific part of the steering operation element, and applying force of a rotation direction to the steering operation element.

According to this item, the driver more easily steers the vehicle to a direction in which the driver has to steer the vehicle.

<Item 12> The control device according to any one of Items 1-11, wherein the display control unit displays the risk information and the avoidance information in different colors.

According to this item, the driver easily distinguishes between the risk information and the avoidance information.

<Item 13> A vehicle (1) comprising the control device (2) according to any one of Items 1-12.

According to this item, the above effects are obtainable in the form of a vehicle.

<Item 14> A program that causes a computer to function as each unit of the control device according to any one of Items 1-12.

According to this item, the above effects are obtainable in the form of a program.

<Item 15> A method for controlling a vehicle (1) including a display device (92) and a steering operation element (31), the method comprising:

identifying (S403) a risk factor present in surroundings of the vehicle and a direction of the risk factor with respect to the vehicle;

displaying (S406), on the display device, risk information indicating the direction of the risk factor with a first emphasis degree;

taking (S411) a guidance action using the steering operation element, the guidance action guiding a driver of the vehicle to operate the steering operation element to avoid the risk factor; and when taking the guidance action using the steering operation element, displaying (S409), on the display device, avoidance information indicating an advancing direction of the vehicle to avoid the risk factor, and displaying (S410) the risk information with a second emphasis degree lower than the first emphasis degree, or not displaying the risk information.

According to this item, the attention of the driver can be attracted to the avoidance information, so that the steering by the driver can be guided to avoid the risk.

<Item 16> A control device (2) for controlling a vehicle (1) including a display device (82), the control device comprising:

a risk identification unit (202) configured to identify a risk factor (1101, 1202) present in surroundings of the vehicle;

a display control unit (205) configured to display, on the display device, risk information (1105, 1205) indicating that the risk factor is present in the surroundings of the vehicle;

a first determination unit (204) configured to determine whether a driver of the vehicle recognizes the risk factor;

a second determination unit (204) configured to determine whether the driver is able to visually recognize a display position of the risk information; and a notification unit (205) configured to give a supplementary notification for notifying the driver that the risk factor is present in a mode different from displaying the risk information in the display position, in a case where it is determined that the driver does not recognize the risk factor and it is determined that the driver is not able to visually recognize the display position of the risk information.

According to this item, it becomes possible to appropriately notify the driver of the presence of the risk by giving the supplementary notification, in a case where the driver is not able to visually recognize the location of the risk information.

<Item 17> The control device according to Item 16, wherein either in a case where it is determined that the driver recognizes the risk factor or in a case where it is determined that driver is able to visually recognize the display position of the risk information, the notification unit does not give the supplementary notification.

According to this item, the supplementary notification is not given, when unnecessary. Therefore, annoyance to the driver is reduced.

<Item 18> The control device according to Item 16 of 17, further comprising a visual field estimation unit (203) configured to estimate a visual field (1104, 1204) of the driver, wherein the second determination unit determines whether the driver is able to visually recognize the display position of the risk information, based on whether the display position where the risk information is displayed is included in the visual field of the driver that has been estimated.

According to this item, whether the driver is able to visually recognize the display position of the risk information can be recognized with accuracy.

<Item 19> The control device according to any one of Items 16-18, wherein the supplementary notification includes notifying the driver that the risk factor is present in a mode recognizable by a sense other than a visual sense.

According to this item, the presence of the risk factor can be notified to the driver without depending on the driver's visual sense.

<Item 20> The control device according to any one of Items 16-19, wherein the supplementary notification includes outputting audible information indicating that the risk factor is present.

According to this item, the presence of the risk factor can be notified to the driver, regardless of the line-of-sight direction of the driver.

<Item 21> The control device according to Item 20, wherein the supplementary notification includes adjusting a sound quality of the audible information to indicate a direction of the risk factor with respect to the vehicle.

According to this item, the presence of the risk factor can be notified to the driver in a more specific manner.

<Item 22> The control device according to any one of Items 16-21, wherein the supplementary notification includes vibrating a steering operation element of the vehicle.

According to this item, the presence of the risk factor can be notified to the driver, regardless of the line-of-sight direction of the driver or regardless of the presence of another type of audible information.

<Item 23> The control device according to any one of Items 16-22, wherein the risk identification unit further identifies a direction of the risk factor with respect to the vehicle, and the risk information further indicates the direction of the risk factor.

According to this item, the direction of the risk factor can be notified to the driver, and the driver easily handles the risk appropriately.

<Item 24> The control device according to Item 23, wherein the notification unit further indicates the direction of the risk factor in a mode different from displaying the risk information in the display position.

According to this item, also in the case where the driver is not able to visually recognize the location of the risk information, the direction of the risk factor can be notified to the driver.

<Item 25> The control device according to any one of Items 16-24, wherein in a case where it is determined that the driver does not recognize the risk factor and it is determined that the driver is not able to visually recognize the display position of the risk information, the supplementary notification is given, and then the risk information is displayed.

According to this item, the driver easily recognizes that the risk information is newly displayed on the display device.

<Item 26> A vehicle (1) comprising the control device (2) according to any one of Items 16-25.

According to this item, the above effects are obtainable in the form of a vehicle.

<Item 27> A program that causes a computer to function as each unit of the control device according to any one of Items 16-25.

According to this item, the above effects are obtainable in the form of a program.

<Item 28> A method for controlling a vehicle (1) including a display device (82), the method comprising:

identifying (S1002) a risk factor (1101, 1202) present in surroundings of the vehicle;

displaying (S1008), on the display device, risk information (1105, 1205) indicating that the risk factor is present in the surroundings of the vehicle;

determining (S1004) whether a driver of the vehicle recognizes the risk factor;

determining (S1005) whether the driver is able to visually recognize a display position of the risk information; and giving (S1006) a supplementary notification for notifying the driver that the risk factor is present in a mode different from displaying the risk information in the display position, in a case where it is determined that the driver does not recognize the risk factor and it is determined that the driver is not able to visually recognize the display position of the risk information.

According to this item, in the case where the driver is not able to visually recognize the location of the risk information, the presence of the risk can be notified to the driver appropriately by giving the supplementary notification.

The invention is not limited to the foregoing embodiments, and various variations/changes are possible within the spirit of the invention.

What is claimed is:

1. A control device for controlling a vehicle including a display device and a steering operation element, the control device comprising a memory storing instructions, and at least one processor configured to execute the instructions to:

identify a risk factor present in surroundings of the vehicle and a direction of the risk factor with respect to the vehicle;

display, on the display device, risk information indicating the direction of the risk factor with a first emphasis degree; and take a guidance action using the steering operation element, the guidance action guiding a driver of the vehicle to operate the steering operation element to avoid the risk factor;

when the guidance action is taken using the steering operation element, display, on the display device, avoidance information indicating an advancing direction of the vehicle to avoid the risk factor, and the risk information with a second emphasis degree lower than the first emphasis degree; and in a case where a display position of the avoidance information overlaps a display position of the risk information, shift the display position of the risk information to a direction of moving away from a route of the vehicle for avoiding the risk factor.

2. The control device according to claim 1, wherein the at least one processor is further configured to execute the instructions to display the avoidance information with a third emphasis degree higher than the second emphasis degree.

3. The control device according to claim 1, wherein the at least one processor is further configured to execute the instructions to:

detect a line-of-sight direction of the driver;

determine whether the driver recognizes the risk factor, based on the line-of-sight direction; and in a case where the risk factor is present and the guidance action is not taken using the steering operation element, when it is determined that the driver does not recognize the risk factor, display, on the display device, the risk information with the first emphasis degree, and when it is determined that the driver recognizes the risk factor, display, on the display device, the risk information with a fourth emphasis degree lower than the first emphasis degree.

4. The control device according to claim 1, wherein the at least one processor is further configured to execute the instructions to identify a distance to the risk factor, and the risk information further indicates the distance to the risk factor.

5. The control device according to claim 1, wherein the at least one processor is further configured to execute the instructions to, in a case where a possibility that the vehicle comes into contact with an object present in the surroundings of the vehicle is equal to or larger than a threshold, identify the object as the risk factor.

6. The control device according to claim 1, wherein the at least one processor is further configured to execute the instructions to, in a case where the risk factor is present and while the guidance action is not taken using the steering operation element, keep displaying the risk information.

7. The control device according to claim 1, wherein the risk factor includes a traffic participant present in the surroundings of the vehicle.

8. The control device according to claim 1, wherein the guidance action includes at least one of changing torque for the driver to rotate the steering operation element, vibrating a specific part of the steering operation element, and applying force of a rotation direction to the steering operation element.

9. The control device according to claim 1, wherein the at least one processor is further configured to execute the instructions to display the risk information and the avoidance information in different colors.

10. A vehicle comprising the control device according to claim 1.

11. A non-transitory storage medium for storing a program that causes a computer to function as the control device according to claim 1.

12. A method for controlling a vehicle including a display device and a steering operation element, the method comprising:

identifying a risk factor present in surroundings of the vehicle and a direction of the risk factor with respect to the vehicle;

displaying, on the display device, risk information indicating the direction of the risk factor with a first emphasis degree;

taking a guidance action using the steering operation element, the guidance action guiding a driver of the vehicle to operate the steering operation element to avoid the risk factor;

when the guidance action is taken using the steering operation element, displaying, on the display device, avoidance information indicating an advancing direction of the vehicle to avoid the risk factor and the risk information with a second emphasis degree lower than the first emphasis degree; and in a case where a display position of the avoidance information overlaps a display position of the risk information, shifting the display position of the risk information to a direction of moving away from a route of the vehicle for avoiding the risk factor.

* * * * *